United States Patent
Sen et al.

(10) Patent No.: US 7,433,774 B2
(45) Date of Patent: Oct. 7, 2008

(54) CONTROL SYSTEM FOR CYLINDER CUT-OFF INTERNAL COMBUSTION ENGINE

(75) Inventors: Naoto Sen, Wako (JP); Tadayoshi Okada, Wako (JP); Akira Sugiyama, Wako (JP); Kenichi Nishida, Wako (JP); Yasuhiko Tomokuni, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 720 days.

(21) Appl. No.: 10/772,370

(22) Filed: Feb. 6, 2004

(65) Prior Publication Data

US 2004/0158383 A1    Aug. 12, 2004

(51) Int. Cl.
*G06G 7/70* (2006.01)
*G06F 19/00* (2006.01)

(52) U.S. Cl. ............ 701/102; 123/350; 123/198 F; 701/101; 701/112

(58) Field of Classification Search ............ 701/96, 701/110, 93, 102, 101, 112; 123/198 F, 350, 123/352, 399; 180/179
See application file for complete search history.

(56) References Cited

U.S. PATENT DOCUMENTS

| | | | | |
|---|---|---|---|---|
| 4,543,933 A | * | 10/1985 | Kessler et al. | 123/361 |
| 5,137,104 A | * | 8/1992 | Etoh | 180/179 |
| 5,267,541 A | * | 12/1993 | Taguchi et al. | 123/198 F |
| 5,415,143 A | * | 5/1995 | Togai | 123/339.17 |
| 5,481,461 A | * | 1/1996 | Miyamoto et al. | 701/99 |
| 5,625,558 A | * | 4/1997 | Togai et al. | 701/93 |
| 5,646,851 A | * | 7/1997 | O'Connell et al. | 701/93 |
| 6,244,258 B1 | * | 6/2001 | Akiyama et al. | 123/568.21 |
| 6,278,915 B1 | | 8/2001 | Deguchi et al. | |

(Continued)

FOREIGN PATENT DOCUMENTS

DE    10007136    9/2000

(Continued)

OTHER PUBLICATIONS

Control design of an automated highway system; Horowitz, R. et al.; Proceedings of the IEEE vol. 88, Issue 7, Jul. 2000 pp. 913-925, Digital Object Identifier 10.1109/5.871301.*

(Continued)

*Primary Examiner*—Cuong Nguyen
(74) *Attorney, Agent, or Firm*—Arent Fox LLP.

(57) ABSTRACT

In a control system for an internal combustion engine having a plurality of cylinders and mounted on a vehicle, in which the engine operation is switched based on the throttle opening between a full-cylinder operation in which all of the cylinders are operative and a cut-off cylinder operation in which some of the cylinders are inoperative, and a running control including a cruise control in which the vehicle runs at a desired vehicle velocity and a preceding vehicle follow-up control in which the vehicle runs at a desired vehicle velocity to maintain a desired inter-vehicle distance from a preceding vehicle are conducted. In the system, an acceleration suppression control is conducted if the engine operation is switched from the cut-off cylinder operation to the full-cylinder operation when the running control is in progress. With this, sharp or drastic acceleration accompanying torque fluctuation is effectively avoided, when the engine operation is switched to the full-cylinder operation.

19 Claims, 17 Drawing Sheets

U.S. PATENT DOCUMENTS

| | | | |
|---|---|---|---|
| 6,307,277 B1 | 10/2001 | Tamai et al. | |
| 6,341,594 B1 | 1/2002 | Linden | |
| 6,943,460 B2 * | 9/2005 | Wakashiro et al. | 290/40 C |
| 2004/0012206 A1 * | 1/2004 | Wakashiro et al. | 290/40 C |
| 2004/0158383 A1 * | 8/2004 | Sen et al. | 701/96 |
| 2004/0163866 A1 * | 8/2004 | Sen et al. | 180/179 |
| 2007/0255478 A1 * | 11/2007 | Wakashiro et al. | 701/93 |

FOREIGN PATENT DOCUMENTS

| | | | |
|---|---|---|---|
| EP | 1057677 | | 12/2000 |
| EP | 1445460 A2 * | | 8/2004 |
| JP | 58174135 A * | | 10/1983 |
| JP | 59215963 A * | | 12/1984 |
| JP | 60190641 A * | | 9/1985 |
| JP | 62139936 A * | | 6/1987 |
| JP | 63-138129 A | | 6/1988 |
| JP | 03182645 A * | | 8/1991 |
| JP | 08014081 A * | | 1/1996 |
| JP | 09-290665 | | 11/1997 |
| JP | 10-103097 | | 4/1998 |
| JP | 10184513 A * | | 7/1998 |
| JP | 2004293536 A * | | 10/2004 |
| JP | 2004316552 A * | | 11/2004 |

OTHER PUBLICATIONS

Modeling of driver's collision avoidance maneuver based on controller switching model Jong-Hae Kim et al..; Systems, Man and Cybernetics, Part B, IEEE Transactions on, vol. 35, Issue 6, Dec. 2005 pp. 1131-1143 Digital Object Identifier 10.1109/TSMCB.2005.850168.*

On spacing policies for highway vehicle automation, Santhanakrishnan, K. et al.; Intelligent Transportation Systems, IEEE Transactions on, vol. 4, Issue 4, Dec. 2003 pp. 198-204, Digital Object Identifier 10.1109/TITS.2003.821341.*

The system and the function of position regulated speed control device, Nishiyama, Y. et al., Vehicle Navigation and Information Systems Conference, 1996. VNIS '96, vol. 7, Oct. 14-18, 1996 pp. 288-294.*

Longitudinal and Lateral Fuzzy Control Systems Design for Intelligent Vehicles, Hsin-Han Chiang et al., Networking, Sensing and Control, 2006. ICNSC '06. Proceedings of the 2006 IEEE International Conference on, Apr. 23-25, 2006 pp. 544-549.*

A velocity control strategy for vehicular collision avoidance system, Mingyuan Bian; Keqiang Li; Dafeng Jin; Xiaomin Lian; Mechatronics and Automation, 2005 IEEE International Conference, vol. 4, Jul. 29-Aug. 1, 2005 pp. 1827-1830 vol. 4.*

Modeling and Recognition of Human Driving Behavior based on Stochastic Switched ARX model, Suzuki, T. et al.; Decision and Control, 2005 and 2005 European Control Conference. CDC-ECC '05. 44th IEEE Conference on Dec. 12-15, 2005 pp. 5095-5100.*

Longitudinal road gradient estimation using vehicle CAN bus data, Mangan, S. et al., Systems, Man and Cybernetics, 2003. IEEE International Conference on, vol. 3, Oct. 5-8, 2003 pp. 2336-2341 vol. 3.*

Robust performance for autonomous intelligent cruise control systems, Mayr, R.; Decision and Control, 1998. Proceedings of the 37th IEEE Conference on, vol. 1, Dec. 16-18, 1998 pp. 487-492 vol. 1, Digital Object Identifier 10.1109/CDC.1998.760724.*

Evaluation of mixed semi-automated/manual traffic, Bose, A.et al., Control Applications, 1998. Proceedings of the 1998 IEEE International Conference on, vol. 2, Sep. 1-4, 1998 pp. 868-872 vol. 2, Digital Object Identifier 10.1109/CCA.1998.721582.*

Accuracy of Hybrid Spectral Domain-UTD Method; Bosiljevac, M.; Sipus, Z.; Applied Electromagnetics and Communications, 2005, ICECom 2005. 18th International Conference on; Oct. 12-14, 2005 pp.:1-4.*

Delta air-change anticipation for mass air flow and electronic throttle control based systems; Magner, S.; Jankovic, M.; American Control Conference, 2002, Proceedings of the 2002; vol. 2, May 8-10, 2002 pp.:1407-1412 vol. 2; Digital Object Identifier 10.1109/ACC.2002.1023218.*

Spacecraft and mission design of the 'Aeneas' Mercury orbiter using methods of concurrent engineering; Joseph, S.M.; Flowers-Jacobs, N.E.; Jackson, R.P.; Milkovich, S.M.; Scott, K.J.; Aerospace Conference Proceedings, 2000 IEEEE; vol. 7, Mar. 18-25, 2000 pp.:341-355 vol. 7; Digital Object Identifier 10.1109/AERO.2000.879301.*

European Search Report mailed Jan. 30, 2008, in related case EP 04002561.1-2311.

* cited by examiner

CONTROL CONDUCTED WITHIN
THIS PERIOD OF TIME

CONTROL SYSTEM FOR CYLINDER CUT-OFF INTERNAL COMBUSTION ENGINE

BACKGROUND OF THE INVENTION

1. Field of the Invention

This invention relates to a control system for a cylinder cut-off internal combustion engine, and more particularly to a control system for a cylinder cut-off internal combustion engine in which fuel supply to some of the cylinders is cut off during running control such as cruise control.

2. Description of the Related Art

In a conventional multi-cylinder internal combustion engine having a plurality of cylinders, it has been proposed reducing fuel consumption by switching engine operation based on the engine load, between a full-cylinder operation in which all of the cylinders are supplied with fuel to be operative and a cut-off cylinder operation in which some of the cylinders are cut off with fuel supply to be inoperative. In this type of cylinder cut-off internal combustion engine, since shock may sometimes be generated by torque fluctuation during engine operation changeover, it has also been proposed eliminating shock by adjusting the throttle opening during a transitional period of changeover, as taught in Japanese Laid-Open Patent Application H10 (1998)-103097, for example.

It is also known to control a vehicle to cruise at a desired vehicle velocity set by the operator. A similar preceding vehicle follow-up control (so-called "adaptive cruise control") is known in which a vehicle is controlled to detect the distance between itself and a preceding vehicle using radar or the like, and to travel while maintaining a desired inter-vehicle distance between itself and the preceding vehicle. In these types of control, the vehicle velocity or inter-vehicle distance when the operator manipulates a corresponding setting switch is stored as a desired velocity or distance, and the throttle opening is adjusted via an actuator such that the vehicle runs at the stored desired velocity or the vehicle runs at a desired velocity required to maintain the stored desired inter-vehicle distance between itself and the preceding vehicle, as disclosed, e.g., in Japanese Laid-Open Patent Application H9 (1997)-290665.

Typically, in the running control described above, when the vehicle velocity drops, the throttle opening is adjusted more finely and more promptly than a case that an operator operates an accelerator pedal manually. Accordingly, when the vehicle velocity falls during the changeover from the full-cylinder operation to the cut-off cylinder operation, or when the vehicle velocity falls due to a change in the gradient of the road during the cut-off cylinder operation is in progress, the throttle opening is adjusted quickly.

In the former case, however, since the engine torque is insufficient, the intended change in vehicle velocity cannot be obtained and hence, the throttle is likely to be opened excessively. In an internal combustion engine during the cut-off cylinder operation, meanwhile, the cut-off cylinder operation is canceled if the torque is insufficient, when it is determined that the operator intends to accelerate from changes in the throttle opening and the accompanying manifold pressure.

It is therefore preferable to control the throttle opening in a closing direction during running control so as to prevent frequent switching between the cut-off cylinder operation and the full-cylinder operation in such a way that the cut-off cylinder operation is continued as long as possible, whilst switching to the full-cylinder operation is only performed after the vehicle velocity has fallen. In doing so, however, when the vehicle velocity returns to normal, sharp or drastic acceleration (increase in velocity) accompanying the torque fluctuation, may sometimes occur that.

SUMMARY OF THE INVENTION

It is therefore an object of this invention to eliminate the defects described above and to provide a control system for a cylinder cut-off internal combustion engine which enables the operation to switch between the full-cylinder operation and the cut-off cylinder operation based on the engine load and enables to conduct running control such as a cruise control, that can avoid sharp or drastic acceleration accompanying torque fluctuation, when the engine operation is switched to the full-cylinder operation.

In order to achieve the object, this invention provides a system for controlling an internal combustion engine having a plurality of cylinders and mounted on a vehicle, comprising: an engine operation controller that conducts a switching control of engine operation based on a load of the engine between a full-cylinder operation in which all of the cylinders are operative and a cut-off cylinder operation in which some of the cylinders are inoperative; a running controller that conducts a running control including at least one of a cruise control in which the vehicle runs at a desired vehicle velocity and a preceding vehicle follow-up control in which the vehicle runs at a desired vehicle velocity to maintain a desired inter-vehicle distance from a preceding vehicle; and an acceleration suppression controller that conducts an acceleration suppression control if the engine operation is switched from the cut-off cylinder operation to the full-cylinder operation when the running control is in progress.

BRIEF DESCRIPTION OF THE DRAWINGS

The above and other objects and advantages of the invention will be more apparent from the following description and drawings, in which.

DESCRIPTION OF THE PREFERRED EMBODIMENTS

A control system for a cylinder cut-off internal combustion engine according to the embodiments of this invention will be described below with reference to the attached drawings.

Figure 1:
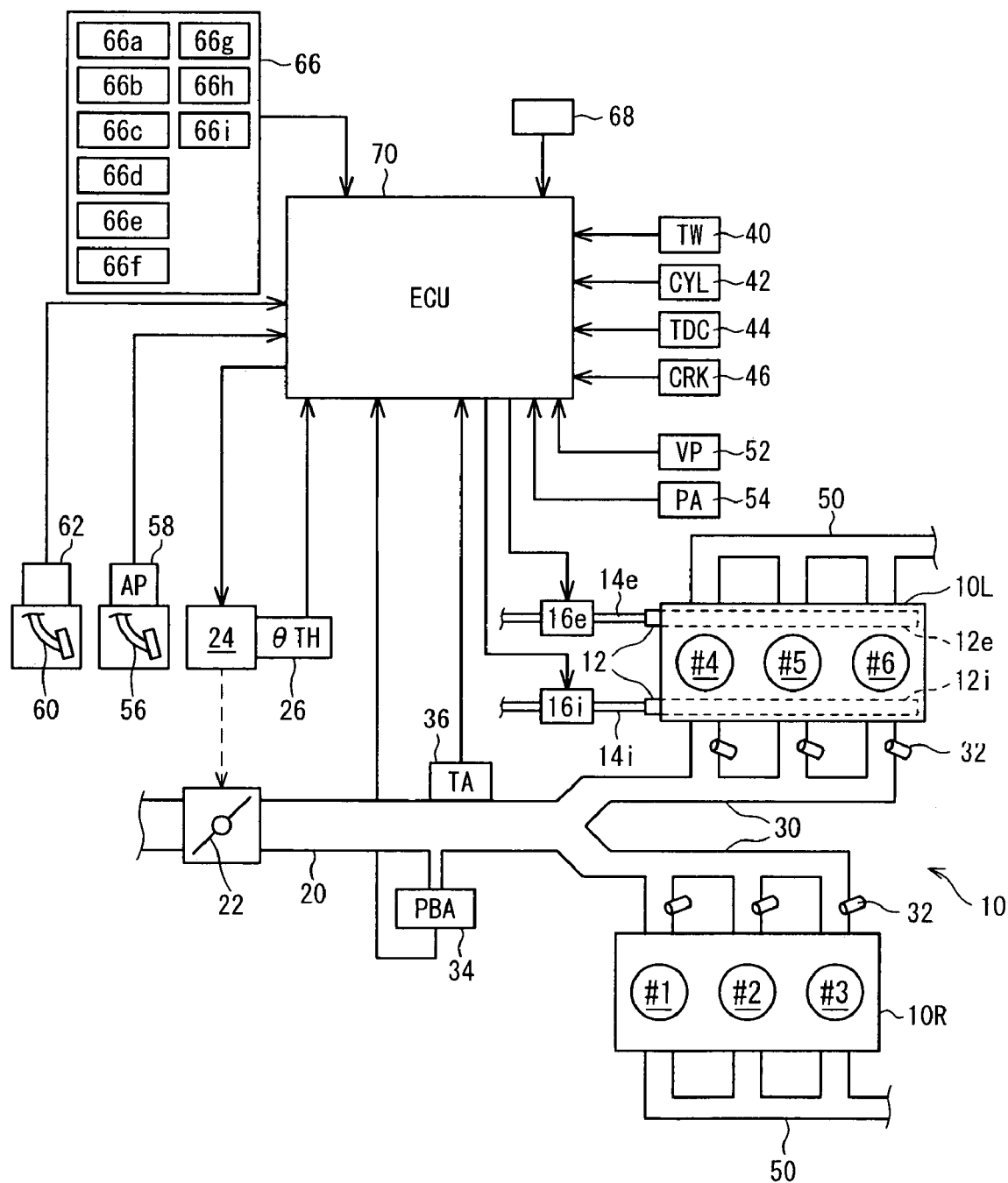
FIG. 1 is a schematic diagram showing the overall structure of a control system for a cylinder cut-off internal combustion engine according to an embodiment of this invention.

FIG. 1 is a schematic diagram showing the overall structure of a control system for a cylinder cut-off internal combustion engine according to the first embodiment.

The reference symbol 10 in the drawing indicates a multi-cylinder internal combustion engine (to be referred to as "engine" below). The engine 10 is constituted as a four-cycle V-type six-cylinder DOHC engine having three cylinders #1, #2, #3 on a right bank 10R and three cylinders #4, #5, #6 on a left bank 10L. A cylinder cut-off mechanism 12 is provided on the left bank 10L of the engine 10.

The cylinder cut-off mechanism 12 comprises an intake side cut-off mechanism 12i for cutting off (closing) the intake valves (not shown) of the cylinders #4 through #6, and an exhaust side cut-off mechanism 12e for cutting off (closing) the exhaust valves (not shown) of the cylinders #4 through #6. The intake side cut-off mechanism 12i and exhaust side cut-off mechanism 12e are connected to a hydraulic pump (not shown) via respective oil passages 14i and 14e. Linear solenoids (electromagnetic solenoids) 16i and 16e are disposed at a point on the oil passages 14i and 14e respectively to supply or block the supply of oil pressure to the intake side cut-off mechanism 12i and exhaust side cut-off mechanism 12e.

The oil passage 14i of the intake side cut-off mechanism 12i is opened when the linear solenoid 16i is deenergized, and when oil pressure is supplied, the contact between the intake valves and intake cams (not shown) of the cylinders #4 through #6 is released such that the intake valves enter a cut-off state (an open state). The oil passage 14e is opened when the linear solenoid 16e is deenergized, and when oil pressure is supplied to the exhaust side cut-off mechanism 12e, the contact between the exhaust valves and exhaust cams (not shown) of the cylinders #4 through #6 is released such that the exhaust valves enter a cut-off state (a closed state). As a result, operations of the cylinders #4 through #6 are cut off, and the engine 10 enters a cut-off cylinder operation in which the engine 10 is operated by the cylinders #1 through #3 alone.

Conversely, when the linear solenoid 16i is energized such that the oil passage 14i closes and the supply of hydraulic fluid to the intake side cut-off mechanism 12i is blocked, the intake valves and intake cams of the cylinders #4 through #6 come into contact, and the intake valves enter an operative state (so as to be opened/closed).

When the linear solenoid 16e is energized such that the oil passage 14e closes and the supply of hydraulic fluid to the exhaust side cut-off mechanism 12e is blocked, the exhaust valves and exhaust cams (not shown) of the cylinders #4 through #6 come into contact, and the exhaust valves enter an operative state (so as to be opened/closed). As a result, the cylinders #4 through #6 are operated and the engine 10 enters a full-cylinder operation. Thus, the engine 10 is constituted as a cylinder cut-off engine (internal combustion engine) which is capable of switching between the full-cylinder operation and the cut-off cylinder operation.

A throttle valve 22 is disposed on an intake pipe 20 of the engine 10 to adjust the amount of intake air. The throttle valve 22 is connected to an electric motor 24 such that the mechanical coupling with the accelerator pedal is severed, and is driven by the electric motor 24 to open and close. A throttle position sensor 26 is provided in the vicinity of the electric motor 24 and outputs a signal corresponding to the position or opening (to be referred to as "throttle opening" below) θTH of the throttle valve 22 in accordance with the amount of rotation of the electric motor 24.

Injectors (fuel injection valves) 32 are provided respectively in the vicinity of the intake ports of each cylinder #1 through #6 immediately after an intake manifold 30 disposed downstream of the throttle valve 22. The injectors 32 are connected to a fuel tank via a fuel supply pipe and a fuel pump (none of which are shown in the drawings), and is supplied with pressurized gasoline fuel from the fuel tank for injection.

A manifold absolute pressure sensor 34 and an intake air temperature sensor 36 are provided on the downstream side of the throttle valve 22 of the intake pipe 20 so as to output signals indicating an absolute pressure inside the intake pipe (indicative of the engine load) PBA and an intake air temperature TA respectively. A water temperature sensor 40 is attached to a cooling water passage (not shown) of the cylinder blocks of the engine 10 so as to output a signal corresponding to an engine cooling water temperature TW.

A cylinder discrimination sensor 42 is attached in the vicinity of the camshaft or crankshaft (not shown) of the engine 10, and outputs a cylinder discrimination signal CYL at a predetermined crank angle position of a specific cylinder (for example, #1). A TDC sensor 44 and a crank angle sensor 46 are also attached to the camshaft or crankshaft of the engine 10, and respectively output a TDC signal at a predetermined crank angle position relating to the TDC position of the piston of each cylinder and a CRK signal at shorter crank angle intervals (for example, thirty degrees) than the TDC signal.

The engine 10 is connected to an exhaust pipe (not shown) via an exhaust manifold 50, and the exhaust gas that is produced during combustion is discharged outside while being purified by a catalytic converter (not shown) provided at a point on the exhaust pipe. A vehicle velocity sensor 52 is disposed in the vicinity of a driveshaft (not shown), and outputs a signal at every predetermined rotation of the driveshaft. An atmospheric pressure sensor 54 is disposed in an appropriate position in the engine room (not shown), and outputs a signal indicating the atmospheric pressure PA at the location in which the vehicle is positioned.

An accelerator position sensor 58 is disposed in the vicinity of an accelerator pedal 56 which is installed on the floor surface of the operator's seat of the vehicle, and outputs a signal corresponding to a position (depression amount or accelerator opening) AP of the accelerator pedal 56 that is operated by the operator. A brake switch 62 is provided in the vicinity of a brake pedal 60, and outputs an ON signal when the operator depresses (manipulates) the brake pedal 60 to operate the brake.

A group of auto-cruise switches (generally assigned with reference numeral 66) is provided in the vicinity of a steering wheel (not shown) which is provided at the operator's seat of the vehicle.

The group of auto-cruise switches 66 is manipulated by the operator, and comprises various switches for inputting operator's instructions such as a desired vehicle velocity during running control. More specifically, this switch group comprises a setting switch 66a for inputting an instruction to conduct cruise control and a desired vehicle velocity, a resume switch 66b for resuming running control after running control has been interrupted by a brake operation or the like, a cancel switch 66c for canceling (ending) running control, an accelerate switch (a vehicle velocity increasing switch for inputting an instruction to increase the desired vehicle velocity) 66d for inputting an instruction to conduct acceleration control in order to increase the vehicle velocity, a decelerate switch (a vehicle velocity decreasing switch for inputting an instruction to reduce the desired vehicle velocity) 66e for inputting an instruction to conduct deceleration control in order to reduce the vehicle velocity, a main switch 66f for enabling manipulation of the switches described above to be effective, a desired inter-vehicle distance setting switch 66g for inputting an instruction to conduct preceding vehicle follow-up control (inter-vehicle distance control) and a desired inter-vehicle distance, a desired inter-vehicle distance increasing switch (inter-vehicle distance increasing switch) 66h for increasing the desired inter-vehicle distance, and a desired inter-vehicle distance decreasing switch (inter-vehicle distance decreasing switch) 66i for decreasing the desired inter-vehicle distance.

It should be noted that the switches described above may be disposed individually, or may be designed such that a plurality of instructions can be inputted by a combination of manipulations. Switches may be integrated such that when, for example, the setting switch is manipulated during execution of running control, a cancellation is indicated, and so on.

A radar 68 is provided in an appropriate position on the front bumper (not shown) or the like facing frontward of the vehicle. The radar 68 has a transmission unit and a reception unit (neither shown), such that electromagnetic waves are emitted frontward of the vehicle from the transmission unit and reflected by the preceding vehicle or the like. The reflected electromagnetic waves (reflected waves) are then received by the reception unit, whereby obstructions such as the preceding vehicle are detected.

The outputs of the various sensors and switches described above are transmitted to an ECU (Electronic Control Unit) 70.

The ECU 70 is constituted as a microcomputer comprising a CPU for performing control calculations, a ROM for storing a control calculation program and various data (tables and the like), a RAM for storing control calculation results from the CPU and so on temporarily, an input circuit, an output circuit, and a counter (none of which are shown in the drawing).

The ECU 70 detects the engine speed NE by counting the CRK signals outputted by the crank angle sensor 46 by the counter, and detects the vehicle velocity VP indicating the traveling velocity (speed) of the vehicle by counting the signals outputted by the vehicle velocity sensor 52 by the counter. The ECU 70 also detects the inter-vehicle distance and relative velocity of the subject vehicle and the preceding vehicle based on the signals from the radar 68, and calculates the desired vehicle velocity from the detected values.

Based on the inputted values, the ECU 70 executes control calculations to determine a fuel injection amount in order to open the injector 32, and to determine an ignition timing in order to control the ignition timing of an ignition device (not shown). Also on the basis of the inputted values, the ECU 70 determines a rotation amount (operating amount) of the electric motor 24 such that the throttle opening $\theta$TH is moved to a desired value THCC, and determines whether or not to energize the solenoids 16i, 16e in order to switch operations of the engine 10 between the full-cylinder operation and the cut-off cylinder operation.

The ECU 70 also conducts running control on the basis of the inputted values, more specifically conducts cruise control to cause the vehicle to run at the desired vehicle velocity set by the operator and preceding vehicle follow-up control (inter-vehicle distance control) to cause the vehicle to run while maintaining a predetermined inter-vehicle distance between itself and the preceding vehicle, and conducts an acceleration suppression control if the engine operation is switched from the cut-off cylinder operation to the full-cylinder operation when the running control is in progress.

As will be explained below, the ECU 70 acts as an engine operation controller that conducts a switching control of engine operation based on a load of the engine ($\theta$TH) between a full-cylinder operation in which all of the cylinders are operative and a cut-off cylinder operation in which some of the cylinders are inoperative, a running controller that conducts a running control including at least one of a cruise control in which the vehicle runs at a desired vehicle velocity and a preceding vehicle follow-up control in which the vehicle runs at a desired vehicle velocity to maintain a desired inter-vehicle distance from a preceding vehicle, and an acceleration suppression controller that conducts an acceleration suppression control if the engine operation is switched from the cut-off cylinder operation to the full-cylinder operation when the running control is in progress.

Next, operations of the control system for a cylinder cut-off internal combustion engine according to this embodiment will be described with reference to FIG. 2 onward.

Figure 2:
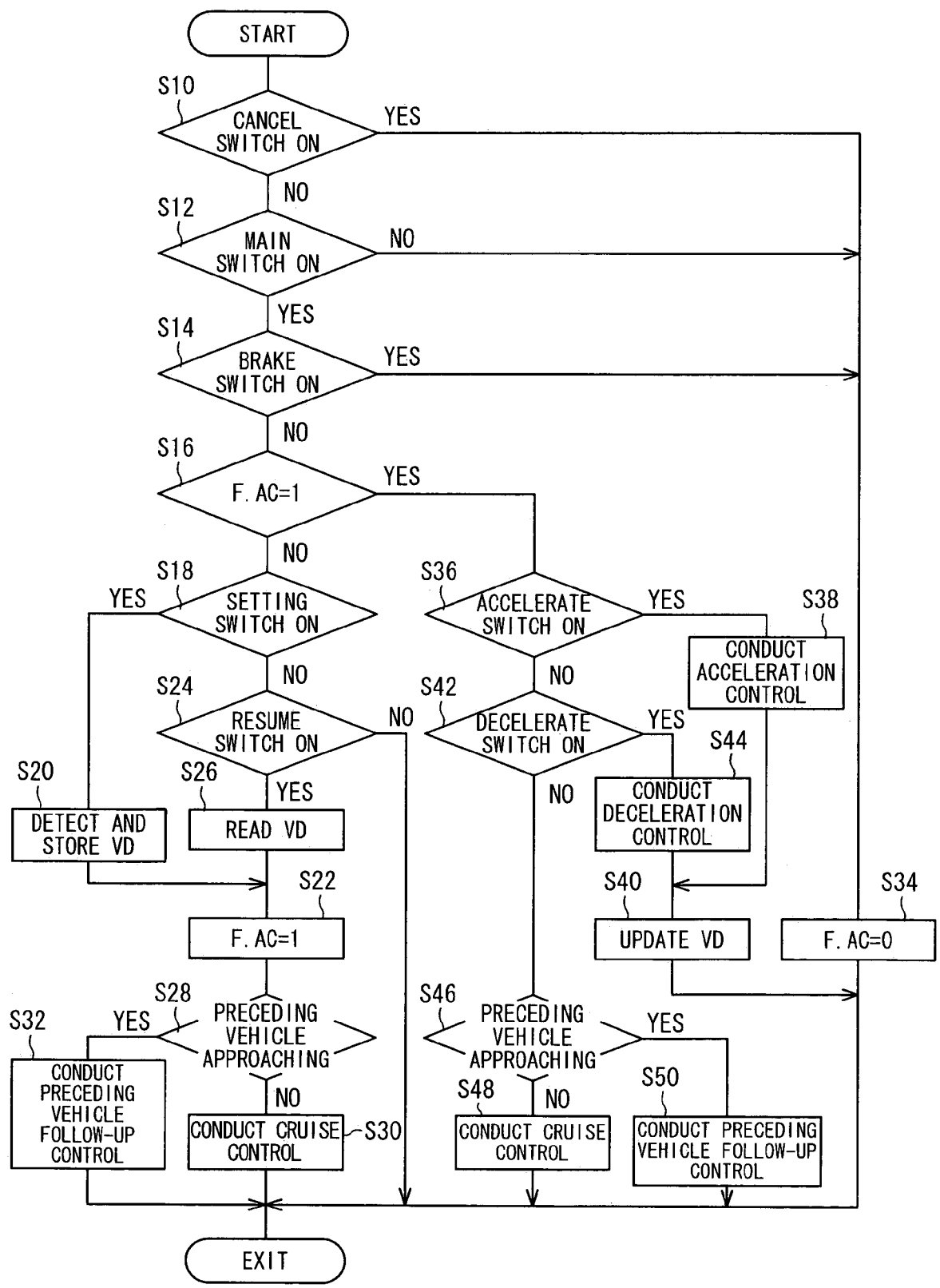
FIG. 2 is a flowchart showing a determination operation for conducting running control from among the operations of the system shown in FIG. 1.

FIG. 2 is a flowchart showing a determination operation for conducting running control, more specifically for cruise control and preceding vehicle follow-up control, from among the operations of the control system. The program shown in the diagram is executed (looped) at TDC (Top Dead Center) or a predetermined crank angle, or at predetermined time intervals, for example.

The program begins in S10 in which it is determined whether the cancel switch 66c is ON, or in other words whether a running control cancellation (end) instruction has been inputted by the operator. If the determination result is negative, the program advances to S12 in which it is determined whether the main switch 66f is ON. If the determination result in S12 is affirmative, the program advances to S14 in which it is determined whether or not the brake switch is ON, or in other words whether the brake pedal 60 has been depressed by the operator.

If the determination result in S14 is negative, the program advances to S16 in which it is determined whether the bit of a flag F.AC is set to 1. The bit of the flag F.AC (having an initial value of 0) is set to 1 in a subsequent step and when the bit is set to 1, it indicates that the running control, in other words the cruise control or preceding vehicle follow-up control (including acceleration and deceleration control performed by switch operation), in which the accelerator pedal 56 and brake pedal 60 need not be manipulated by the operator, is in progress. When the determination result in S16 is negative, the program advances to S18 in which it is determined whether the setting switch 66a is ON, or in other words whether an instruction to conduct running control and a desired vehicle velocity have been inputted by the operator.

If the determination result in S18 is affirmative, the program advances to S20 in which the desired vehicle velocity VD inputted through the setting switch 66a is detected (read) and stored, and then advances to S22 in which the flag F.AC bit is set to 1.

If the determination result in S18 is negative, the program advances to S24 in which a determination is made as to whether or not the resume switch 66b is ON, or in other words whether an instruction to resume running control has been inputted by the operator following the cancellation of running control (when the F.AC bit is reset to 0) caused by a brake manipulation. If the determination result of S24 is affirmative, the program advances to S26 in which the desired vehicle velocity VD stored before the F.AC bit was reset to 0 is read, and then advances to S22. When the determination result in S24 is negative, the F.AC bit is held at 0, and the program is terminated without restarting running control.

Next, the program advances to S28 in which it is determined whether the preceding vehicle is approaching within a predetermined (desired) inter-vehicle distance. If the determination result in S28 is negative, the program advances to S30 in which cruise control is conducted based on the stored desired vehicle velocity VD. More specifically, the amount of current supply (the manipulated variable, more precisely a current supply command value to the electric motor 24 for moving the throttle valve 22) is calculated based on the difference between the desired vehicle velocity VD and the current (detected) velocity VP using a PID controller or the like, whereupon this amount is outputted to the electric motor 24 to control the throttle opening θTH. It should be noted that when deceleration of a predetermined level or greater which cannot be responded to adequately by the throttle opening control is required during cruise control, a brake operation or a gear change (downshift) is conducted in conjunction with the throttle opening control to drive the same in a closing direction.

If the determination result in S28 is affirmative, the program advances to S32 in which preceding vehicle follow-up control is conducted. More specifically, the throttle opening θTH is reduced to decrease the vehicle velocity and maintain the distance between the vehicle itself and the preceding vehicle, detected by the radar 68, at the preset desired inter-vehicle distance. It should also be noted that when similar deceleration of a predetermined level or greater which cannot be responded to adequately by adjusting the throttle opening is required during preceding vehicle follow-up control, a brake operation or a gear change (downshift) is also performed in conjunction with adjustment of the throttle opening in a closing direction.

If, on the other hand, the determination result is affirmative in S10 or S14, or negative in S12, the program advances to S34 in which the flag F.AC bit is set to 0. When the determination result is affirmative in S16, or in other words when running control is in progress, the program advances to S36 in which a determination is made as to whether or not the accelerate switch 66d is ON, or in other words whether an acceleration request has been manipulated by the operator.

When the determination result in S36 is affirmative, the program advances to S38 in which acceleration control is conducted to increase the throttle opening θTH such that the vehicle velocity is increased at a constant acceleration. The program then advances to S40 in which the desired vehicle velocity VD is updated to the velocity following the acceleration. If, on the other hand, the determination result in S36 is negative, the program advances to S42 in which it is determined whether the decelerate switch 66e is ON, or in other words whether the deceleration instruction has been inputted by the operator.

If the determination result in S42 is affirmative, the program advances to S44 in which deceleration control is conducted to decrease the throttle opening θTH such that the vehicle velocity is decreased. The program then advances to S40 in which the desired vehicle velocity VD is updated to the velocity following the deceleration.

If, on the contrary, the determination result in S42 is negative, the program advances to S46 in which it is determined whether the preceding vehicle is approaching within the predetermined inter-vehicle distance. When the determination result in S46 is negative, the program advances to S48 in which cruise control is conducted in accordance with the stored desired vehicle velocity VD, and when the determination result in S46 is affirmative, the program advances to S50 in which the preceding vehicle follow-up control is conducted, in which the vehicle is controlled to run at a desired vehicle velocity to maintain a desired inter-vehicle distance from the preceding vehicle. The desired vehicle velocity is assigned with the same reference VD, but is frequently changed to maintain the desired distance.

Next, referring to FIG. 3 onward, a general switching control operation between the full-cylinder operation and the cut-off cylinder operation will be described.

Figure 3:
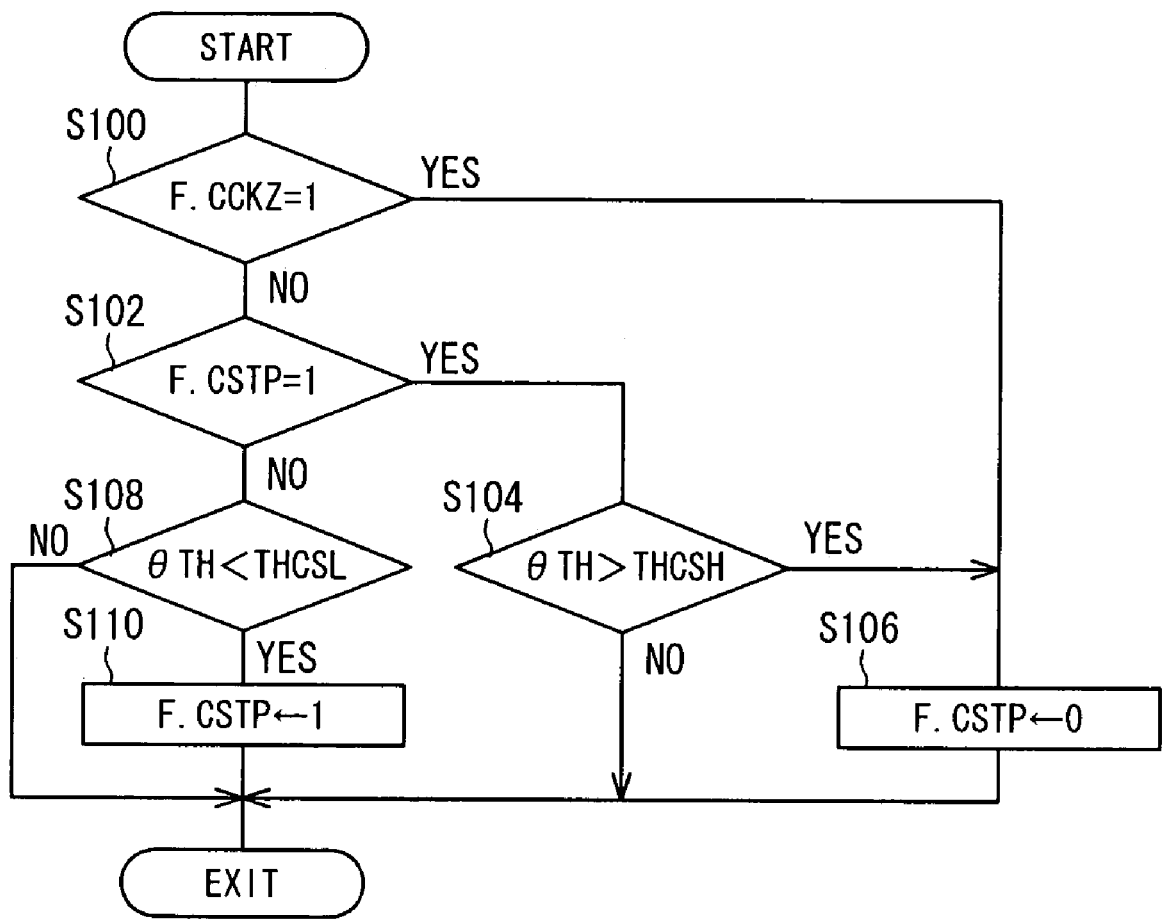
FIG. 3 is a flowchart showing an operation for general switching between a full-cylinder operation and a cut-off cylinder operation from among the operations of the system shown in FIG. 1.

FIG. 3 is a flowchart showing this control operation. The program illustrated in the diagram is also executed (looped) at TDC or a predetermined crank angle in the vicinity thereof, or at predetermined time intervals.

The program begins in S100 in which it is determined whether the bit of a flag F.CCKZ is set to 1. The flag F.CCKZ bit is set by determining whether there is sufficient torque to maintain the current running state by distinguishing (in a routine not shown in the drawings) the behavior of the vehicle and engine load based on the engine speed NE, the throttle opening θTH, the pressure PBA in the intake pipe, and so on. When the bit (initial value 0) is set to 1, it indicates that the fill-cylinder operation is required, and when the bit is set to 0, it indicates that the cut-off cylinder operation is required.

When the determination result in S100 is negative, the program advances to S102 in which it is determined whether the bit of a flag F.CSTP (initial value 0) is set to 1. As will be described below, the bit of the flag F.CSTP indicates that the engine 10 should be operated by the cut-off cylinder operation when set to 1 and by the full-cylinder operation when reset to 0.

If the determination result in S102 is affirmative and it is judged that the cut-off cylinder operation is underway, the program advances to S104 in which the current (detected) throttle opening θTH is compared with a full-cylinder throttle opening threshold value THCSH for determining whether or not the full-cylinder operation should be conducted, and a determination is made as to whether or not the detected throttle opening is larger than the threshold THCSH, or in other words whether the load of the engine 10 is large.

When the determination result in S104 is affirmative and it is determined that the load of the engine 10 is large, the program advances to S106 in which the flag F.CSTP bit is reset to 0 and the engine 10 is set to the full-cylinder operation (switched to the full-cylinder operation). If, on the other hand, the determination result in S104 is negative, the flag F.CSTP bit remains at 1 and the cut-off cylinder operation is continued.

If the determination result in S102 is negative and it is determined that the full-cylinder operation is underway, the program advances to S108 in which the current throttle opening θTH is compared with a cut-off cylinder throttle opening threshold value THCSL for determining whether or not the cut-off cylinder operation should be conducted, and a determination is made as to whether or not the detected value is less than the threshold value THCSL, or in other words whether the load of the engine 10 is small.

When the determination result in S108 is affirmative and it is determined that the load of the engine 10 is small, the program advances to S110 in which the flag F.CSTP bit is set to 1 and the engine 10 is set to the cut-off cylinder operation (switched to the cut-off cylinder operation). If the determination result in S108 is negative, the flag F.CSTP bit remains at 0 and the full-cylinder operation is continued. When the determination result in S100 is affirmative, since the full-cylinder operation is requested, the program advances to S106 in which the flag F.CSTP bit is reset to 0 and the engine 10 is set to a full-cylinder operation.

Next, referring to FIG. 4, the transition control operation for switching from the cut-off cylinder operation to the full-cylinder operation, more specifically a control operation for switching from the cut-off cylinder operation to the full-cylinder operation to suppress acceleration will be described.

Figure 4:
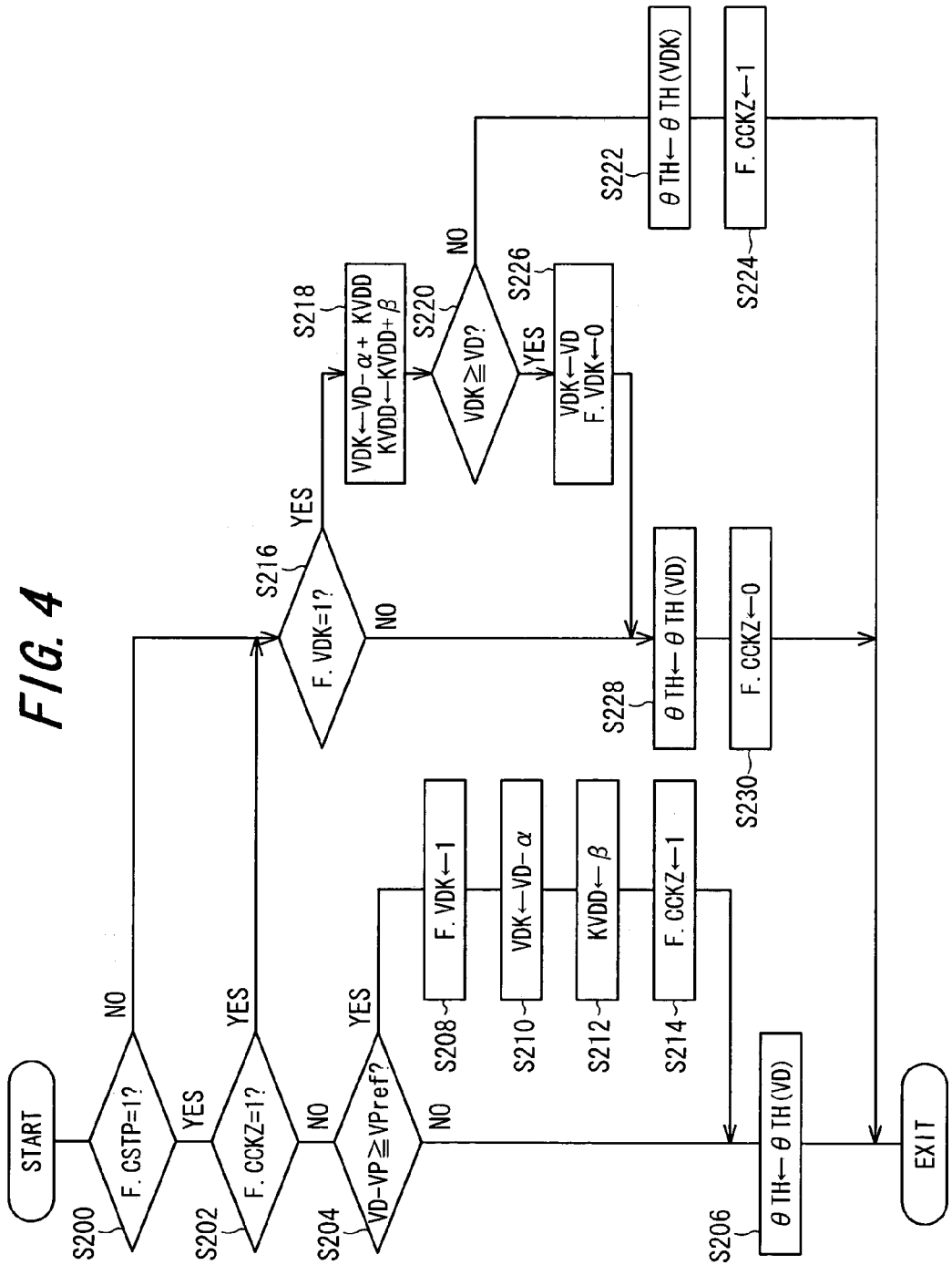
FIG. 4 is a flowchart showing a transition control operation from the cut-off cylinder operation to the full-cylinder operation during execution of running control from among the operations of the system shown in FIG. 1.

FIG. 4 is a flowchart of this operation. The program illustrated in the diagram is executed (looped) when the aforementioned flag F.AC bit is set to 1 (when running control is in progress), at TDC or a predetermined crank angle in the vicinity thereof, or at predetermined time intervals.

First, in S200 it is determined whether the flag F.CSTP bit is set to 1. If the determination result in S200 is affirmative and it is determined that the cut-off cylinder operation is underway, the program advances to S202 in which it is determined whether the flag F.CCKZ bit is set to 1.

When the determination result in S202 is negative, the program advances to S204 in which it is determined whether a difference (deviation) obtained by subtracting the detected vehicle velocity VP from the desired vehicle velocity VD is equal to or greater than a predetermined value VPref (for example, 3 km/h), or in other words whether the current vehicle velocity VP has fallen by the predetermined value VPref or more relative to the desired vehicle velocity VD. When the determination result is negative in S204, the program advances to S206 in which the throttle opening θTH is calculated based on the desired vehicle velocity VD of the engine 10 during the cut-off cylinder operation, more specifically it is calculated such that the difference between the desired vehicle velocity VD and detected vehicle velocity VP decreases, and then the program is terminated. With this, the throttle valve 22 is driven in a routine not shown in the drawings to be controlled to the calculated opening.

If, on the other hand, the determination result in S204 is affirmative, the program advances to S208 in which the bit of a flag F.VDK is set to 1. By setting this flag bit to 1, transition control to be described below for switching from the cut-off cylinder operation to the full-cylinder operation to suppress acceleration is conducted.

Next, the program advances to S210 in which a difference obtained by subtracting a value α from the desired vehicle velocity VD is set as a desired vehicle velocity during transition control VDK, or in other words as a (second) desired vehicle velocity during execution of transition control from the cut-off cylinder operation to the full-cylinder operation. The program then advances to S212 in which an initial value of a value KVDD is set as β, and then advances to S214 in which the flag F.CCKZ bit is set to 1. Setting this flag bit to 1 signifies that the full-cylinder operation is requested during running control is in progress. The program then advances to S206 and is terminated.

If the determination result in S200 is negative in a subsequent program loop, the program advances to S216 in which a determination is made as to whether or not the aforementioned flag F.VDK bit is set to 1. Since this flag bit was set to 1 previously in S208, the determination result here is normally affirmative and the program advances to S218. Even if the determination result in S200 is affirmative, although the program advances to S202, but since the flag bit in S202 was set to 1 previously in S214, the determination result in S202 is affirmative and the program advances similarly to S216.

As shown in the drawing, in S218 the aforementioned value α is subtracted from the desired vehicle velocity VD and the value KVDD is added thereto to calculate the desired vehicle velocity during transition control VDK described above. The initial value of the value KVDD is β, but as shown in the drawing, the value β is added to KVDD upon each calculation to provide a cumulative value.

Next, the program advances to S220 in which it is determined whether the desired vehicle velocity during transition control VDK becomes equal to or greater than the desired vehicle velocity VD. If not, the program advances to S222 in which the throttle opening θTH is calculated based on the desired vehicle velocity during transition control VDK in the engine 10 during the full-cylinder operation, more specifically such that the difference between the desired vehicle velocity during transition control VDK and the detected velocity VP is reduced. The program then advances to S224 in which the flag F.CCKZ bit is set to 1 and the program ends.

When the determination result in S220 is affirmative, the program advances to S226 in which the desired vehicle velocity during transition control VDK is switched with the desired vehicle velocity VD, and the flag F.VDK bit is reset to 0. The program then advances to S228 in which the throttle opening θTH is calculated based on the original desired vehicle velocity VD in the engine 10 during the full-cylinder operation, more specifically it is calculated such that the difference between the desired vehicle velocity VD and the detected velocity VP decreases. When the determination result in S216 is negative in a subsequent program loop, the program advances to S228. Next, the program advances to S230 in which the flag F.CCKZ is reset to 0 and the program ends.

FIG. 5 is a set of time charts illustrating the transition control shown in FIG. 4.

Figure 5A:
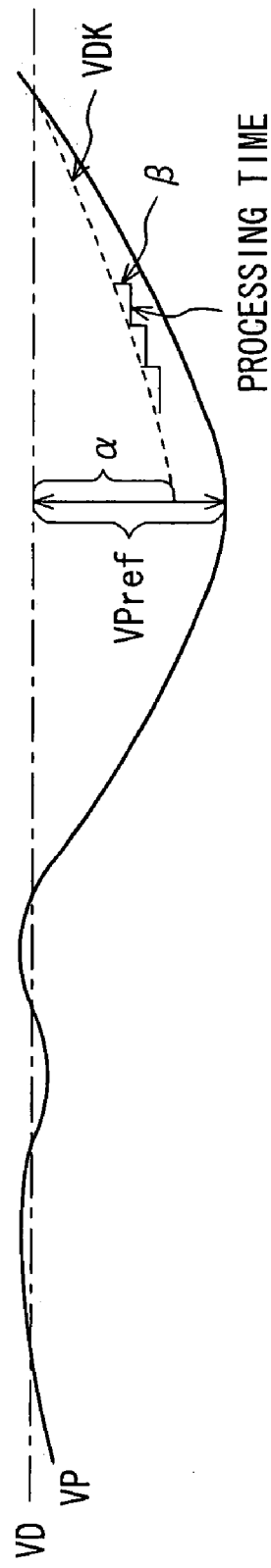
FIG. 5 is a set of time charts each illustrating the processing shown in the flowchart in FIG. 4.

As shown in FIG. 5A, during the transition control shown in FIG. 4, when the difference obtained by subtracting the detected vehicle velocity VP (shown by the solid line) from the desired vehicle velocity VD (shown by the dot/dash line) is equal to or greater than the predetermined value VPref, the value obtained by adding the value KVDD to the difference obtained by subtracting the value a from the desired vehicle velocity VD is set as the desired vehicle velocity during transition control VDK, and the throttle opening θTH is calculated based thereon.

In other words, when a switch (transition) is performed from the cut-off cylinder operation to the full-cylinder operation during running control, the throttle opening θTH is calculated based on the second desired vehicle velocity VDK which is obtained by reducing the original desired vehicle velocity VD, and hence during running control, the desired vehicle velocity is decreased such that acceleration is suppressed. Thus, during a transition from the cut-off cylinder operation to the full-cylinder operation, sharp or drastic acceleration (increase in vehicle velocity) that accompanies torque fluctuation can be effectively avoided.

Further, whenever the value KVDD is calculated (at each processing period, more specifically, whenever the processing shown in FIG. 4 is executed), the value KVDD is increased by adding β. With this, the second desired vehicle velocity VDK is calculated so as to gradually return to or approach the original desired vehicle velocity VD upon each calculation.

When it is determined in S220 that the desired vehicle velocity during transition control VDK becomes equal to or greater than the desired vehicle velocity VD, the program advances to S228 (via S226) in which the throttle opening θTH is calculated on the basis of the desired vehicle velocity VD, or in other words running control is conducted. With this, it becomes possible to prevent such a transition control from continuing unnecessarily.

Figure 5B:
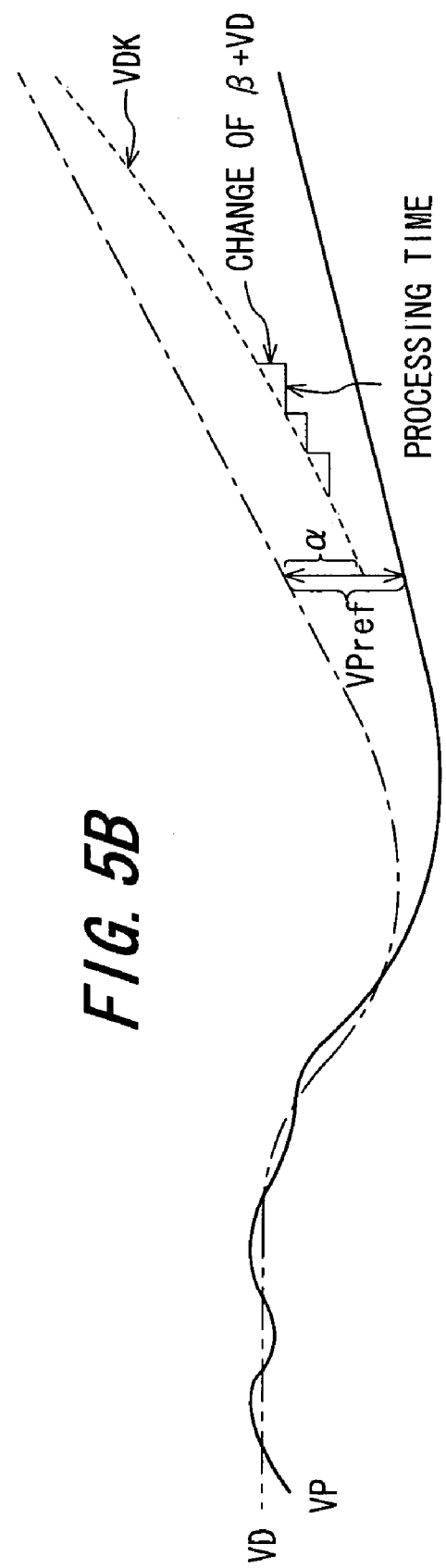

During the preceding vehicle follow-up control in which the vehicle travels while following the preceding vehicle, the desired vehicle velocity VD (also shown by a dot/dash line) is determined based on the inter-vehicle distance and relative velocity with the preceding vehicle, i.e. the desired vehicle velocity is determined to maintain a desired inter-vehicle distance. As a result, as shown in FIG. 5B, the desired vehicle velocity VD must be changed frequently. Likewise in such a case, since the processing shown in FIG. 4 is executed at predetermined intervals, the second desired vehicle velocity VDK is recalculated on the basis of the changed desired vehicle velocity VD. As a result, the second desired vehicle velocity VDK is determined to reliably approach the desired vehicle velocity VD even when the desired vehicle velocity VD is changed frequently.

It should be noted that in the processing shown in FIG. 4, the calculation of the throttle opening θTH in S206 is performed during the cut-off cylinder operation, and the calculation of the throttle opening θTH in S228 (or S222) is performed during the full-cylinder operation. Therefore, although the expressions are identical to each other, since the number of cylinders in operation is different, the calculated values will differ.

As described above, this embodiment is configured such that when a switch (transition) is performed from the cut-off cylinder operation to the full-cylinder operation while running control is in progress, the throttle opening θTH is calculated on the basis of the second desired vehicle velocity VDK which is a value obtained by reducing the original desired vehicle velocity VD. With this, the throttle opening θTH is decreased during running control so as to suppress acceleration. Thus during a transition from the cut-off cylinder operation to the full-cylinder operation, sharp or drastic increase in velocity accompanying torque fluctuation can be effectively avoided.

Figure 6:
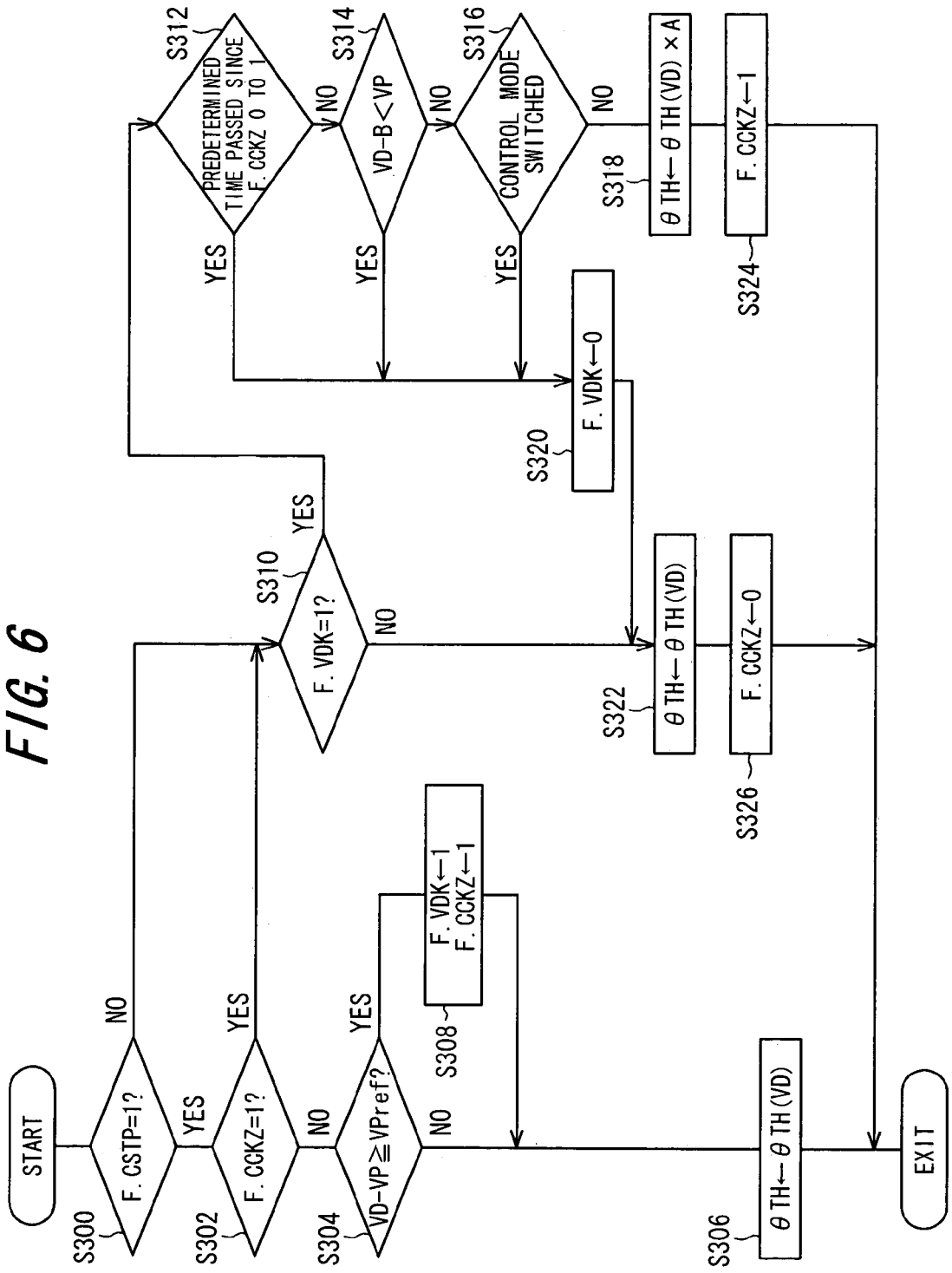
FIG. 6 is a view, similar to FIG. 4, but showing a transition control operation from the cut-off cylinder operation to the full-cylinder operation while running control is in progress from among the operations of a control system for a cylinder cut-off internal combustion engine according to a second embodiment of this invention.

FIG. 6 is a view, similar to FIG. 4, but showing a transition control operation from the cut-off cylinder operation to the full-cylinder operation, which is an operation of a control system for a cylinder cut-off internal combustion engine according to a second embodiment of this invention.

The program illustrated in this diagram is also executed (looped) when the aforementioned flag F.AC bit is set to 1 (when running control is under execution), at TDC or a predetermined crank angle in the vicinity thereof, or at predetermined time intervals.

Similar processing to that of the first embodiment is performed from S300 through S306, and when the determination result in S304 is affirmative, the program advances to S308 in which the bits of the flag F.VDK and the flag F.CCKZ are set to 1.

When the determination result in S300 is negative or that in S302 is affirmative in a subsequent program loop, the program advances to S310 in which it is determined whether the flag F.VDK bit is set to 1. The bit of this flag has been set to 1 previously in S308, and hence the determination result here is naturally affirmative. The program then advances to S312 in which a determination is made as to whether or not a predetermined period of time (for example, ten seconds) has passed or elapsed since the flag F.CCKZ bit was changed from 0 to 1.

In cases where this flag bit was set to 1 in S308 of a previous program loop or the like, the determination result in S312 is usually negative, and hence the program advances to S314 in which it is determined whether the difference obtained by subtracting a vehicle velocity B from the desired vehicle velocity VD is less than the detected velocity VP. Here, the vehicle velocity B indicates a threshold value for determining whether vehicle velocity has returned, more precisely the vehicle velocity has almost returned to the desired vehicle velocity.

When the determination result in S314 is negative, the program advances to S316 in which a determination is made as to whether or not a switch in the running control mode takes place, more specifically whether the desired vehicle velocity VD has changed, i.e., the condition for conducting the running control is changed. If the determination result in S316 is negative, the program advances to S318 in which the throttle opening θTH is calculated on the basis of the desired vehicle velocity VD of the engine 10 during the full-cylinder operation, more specifically it is calculated such that the difference between the desired vehicle velocity VD and detected vehicle velocity VP decreases, and a product obtained by multiplying the calculated value by a coefficient A is set as the throttle opening θTH. The coefficient A is set at a value of less than 1.0. The program advances to S324 in which the flag F.CCKZ bit is set to 1 and the program ends.

If, on the other hand, the determination result in any of S312, S314, and S316 is affirmative, the program advances to S320 in which the flag F.VDK bit is reset to 0, and then advances to S322 in which the throttle opening θTH is calculated on the basis of the desired vehicle velocity VD of the engine 10 during the full-cylinder operation. Next, the program advances to S326 in which the flag F.CCKZ bit is reset to 0 and the program ends.

Figure 7:
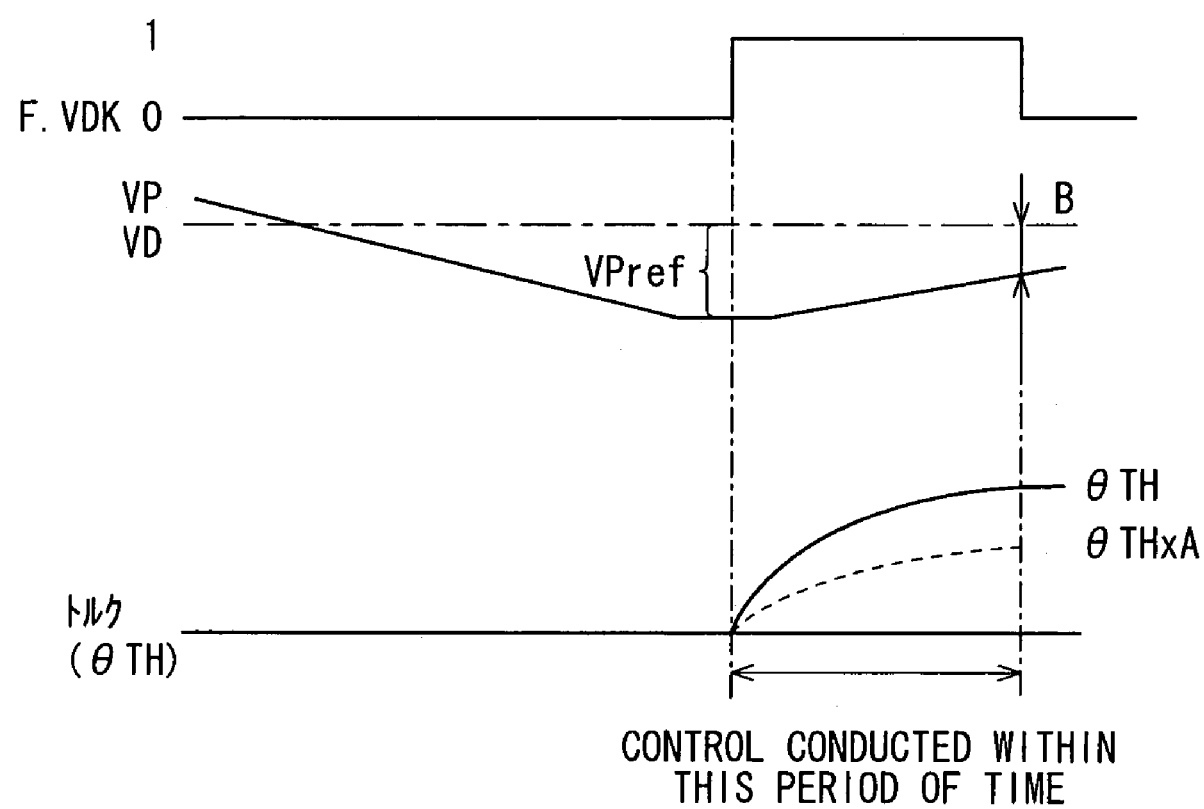
FIG. 7 is a time chart illustrating the processing shown in the flowchart in FIG. 6.

FIG. 7 is a time chart illustrating the transition control shown in FIG. 6.

As shown in the chart, when the difference obtained by subtracting the detected vehicle velocity VP from the desired vehicle velocity VD is equal to or greater than the predetermined value VPref during the transition control shown in FIG. 6, the flag F.VDK bit is set to 1, and in accordance therewith, the throttle opening θTH is calculated based on the desired vehicle velocity VD and the product obtained by multiplying the calculated value by the coefficient A of less than 1.0 is set as the throttle opening θTH. Thus, by conducting running control based on the calculations described above, the amount of change in the throttle opening θTH during running control is reduced, whereby enabling to suppress acceleration. With this, during a transition from the cut-off cylinder operation to the full-cylinder operation, sharp or drastic increase in velocity accompanying torque fluctuation can be surely prevented.

It should be noted that in the second embodiment, when the difference between the desired vehicle velocity VD and detected velocity VP is less than the aforementioned vehicle velocity B, acceleration suppression control is discontinued (S314, S320).

The acceleration suppression control is also discontinued when a predetermined period of time has passed or elapsed after the flag F.CCKZ is set to 1 (in other words, after the throttle opening θTH is corrected upon multiplication by the coefficient A) (S312 (S318), S320). Similarly, the acceleration suppression control is discontinued when the control mode is switched, or in other words when the running control conditions change (S316, S320). Thus, since the acceleration suppression control is discontinued if at least one of these three conditions is satisfied or established, the acceleration suppression control is not continued or prolonged unnecessarily.

As described above, the second embodiment is configured such that during a switch (transition) from the cut-off cylinder operation to the full-cylinder operation when running control is in progress, the throttle opening θTH is calculated and the product obtained by multiplying the calculated value by the coefficient A of less than 1.0 is set as the throttle opening θTH, whereupon running control is performed based on the set value. As a result, acceleration is suppressed, and the aforesaid increases in velocity that accompanies torque fluctuation during a transition from the cut-off cylinder operation to the full-cylinder operation can be avoided without fail. The remaining structures are identical to those of the first embodiment.

Figure 8:
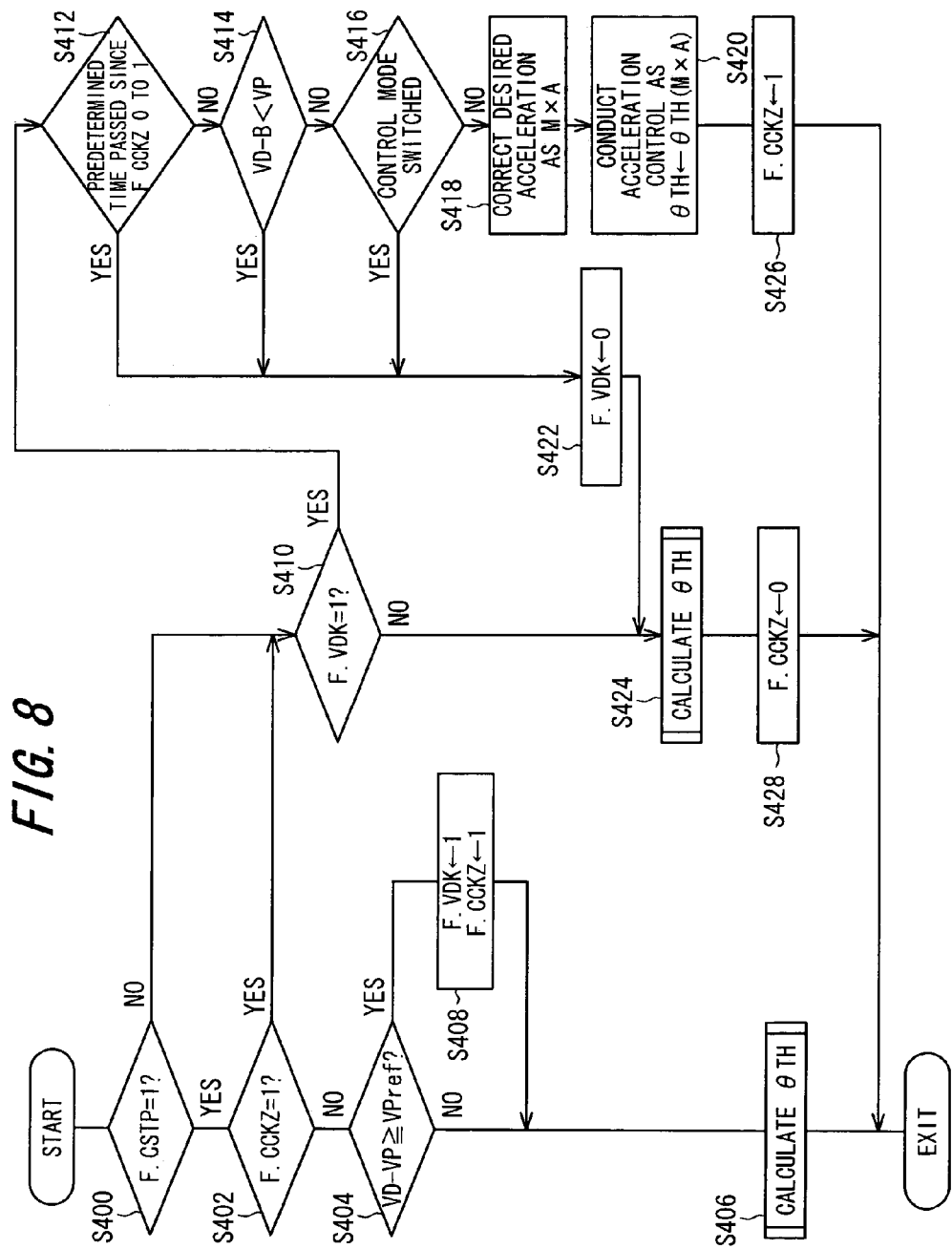
FIG. 8 is a view, similar to FIG. 4, but showing a transition control operation from the cut-off cylinder operation to the full-cylinder operation while running control is in progress from among the operations of a control system for a cylinder cut-off internal combustion engine according to a third embodiment of this invention.

FIG. 8 is a view, similar to FIG. 4, but showing a transition control operation from the cut-off cylinder operation to the full-cylinder operation, which is an operation of a control system for a cylinder cut-off internal combustion engine according to a third embodiment of this invention.

The program illustrated in this diagram is also executed (looped) when the aforementioned flag F.AC bit is set to 1 (when running control is in progress), at TDC or a predetermined crank angle in the vicinity thereof, or at predetermined time intervals.

Similar processing to that of the first embodiment is performed from S400 through S404, whereupon the program advances to S406 to calculate the throttle opening θTH.

Figure 9:
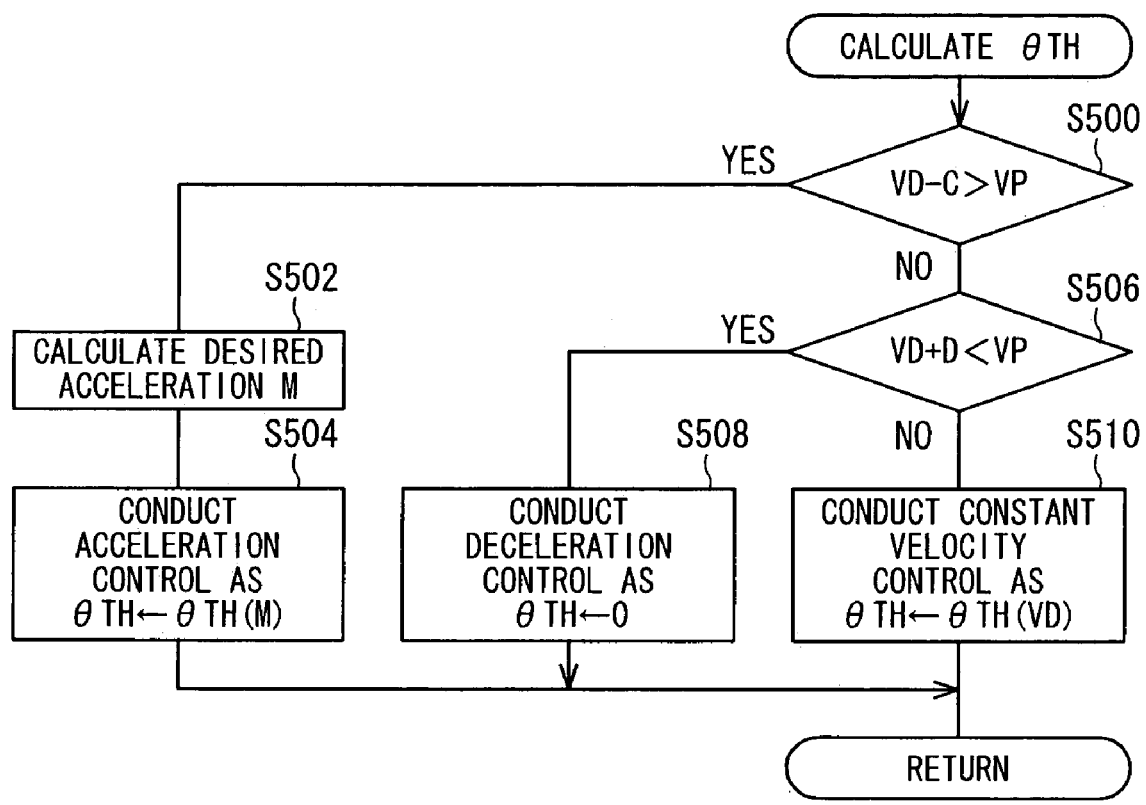
FIG. 9 is a subroutine flowchart of the throttle opening calculation processing shown in the flowchart in FIG. 8.

FIG. 9 is a subroutine flowchart showing throttle opening calculation processing.

Figure 10:
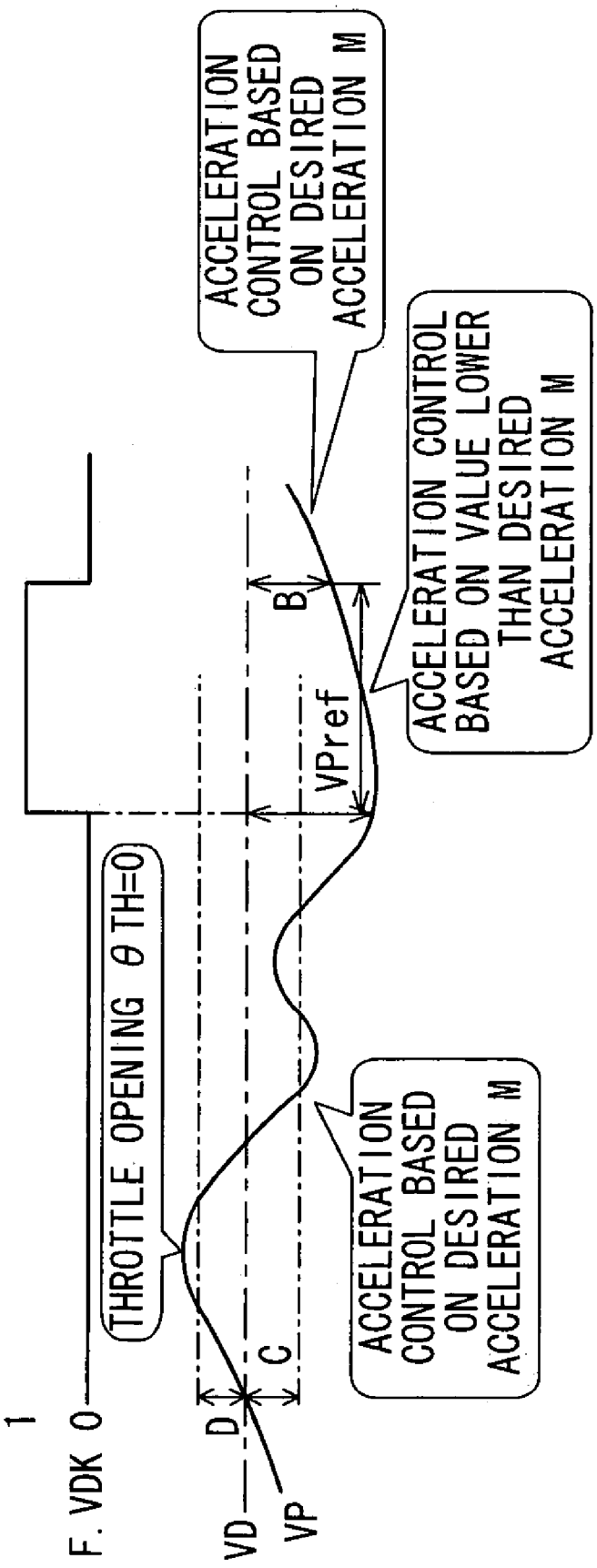
FIG. 10 is a time chart illustrating the processing shown in the flowchart in FIG. 8.

In S500 it is determined whether a difference obtained by subtracting a first vehicle velocity C from the desired vehicle velocity VD exceeds the detected vehicle velocity VP. FIG. 10 is a time chart illustrating the processing of the third embodiment shown in FIGS. 8 and 9, and the first vehicle velocity C is shown in the chart.

When the determination result in S500 of the flowchart in FIG. 9 is affirmative, the program advances to S502 in which a desired vehicle acceleration M is calculated. The desired vehicle acceleration M is set at 2.0 km/h per second, for example, in other words 2.0 km/h/s. Next, the program advances to S504 in which acceleration control is conducted. In other words, the throttle opening θTH is calculated on the basis of the calculated desired vehicle acceleration M. More specifically, the throttle opening θTH is calculated so as to realize the calculated desired vehicle acceleration M.

If, on the other hand, the determination result in S500 is negative, the program advances to S506 in which it is determined whether a sum obtained by adding a second vehicle velocity D to the desired vehicle velocity VD is less than the detected velocity VP. FIG. 10 shows the second vehicle velocity D. If the determination result in S506 is affirmative, the program advances to S508 in which deceleration control is conducted. In other words, the throttle opening θTH is set to 0. When the determination result in S506 is negative, the program advances to S510 in which the throttle opening θTH is calculated on the basis of the desired vehicle velocity VD, more specifically it is calculated such that the difference between the detected velocity VP and the desired vehicle velocity VD is reduced.

Returning to FIG. 8, if the determination result in S404 is affirmative, the program advances to S408 in which the bits of the flag F.VDK and the flag F.CCKZ are set to 1. When the determination result is negative in S400 or affirmative in S402, the program advances to S410 in which a determination is made as to whether or not the flag F.VDK bit has been set to 1. Since this flag bit was set to 1 previously in S408, the determination result here is normally affirmative and the program therefore advances to S412 in which a determination is made as to whether or not a predetermined period of time (for example, ten seconds) has passed since the flag F.CCKZ bit was changed from 0 to 1.

In cases where this flag bit was set to 1 in S408 in a previous program loop or the like, the determination result in S412 is usually negative, and the program advances to S414 in which a determination is made as to whether or not the difference obtained by subtracting the vehicle velocity B from the desired vehicle velocity VD is less than the detected vehicle velocity VP. When the determination result in S414 is negative, the program advances to S416 in which it is determined whether the running control mode has been switched, more specifically whether a change or the like in the desired vehicle velocity VD has occurred.

When the determination result in S416 is negative, the program advances to S418 in which the desired vehicle acceleration is corrected (calculated) by multiplying the desired vehicle acceleration M calculated in S502 by the aforementioned coefficient A of less than 1.0. In other words, a second desired vehicle acceleration is calculated by reducing the desired vehicle acceleration M.

Next, the program advances to S420 in which the acceleration control is conducted. In other words, the throttle opening θTH is calculated on the basis of the calculated second desired vehicle acceleration M×A. More specifically, the throttle opening θTH is calculated to realize the calculated second desired vehicle acceleration M×A. Thus, the throttle opening θTH is calculated on the basis of the second desired vehicle acceleration M×A which is produced by reducing the desired vehicle acceleration M, and running control is performed on this basis. The program then advances to S426 in which the flag F.CCKZ bit is set to 1 and the program ends.

If, on the other hand, the determination result in any of S412, S414, and S416 is affirmative, the program advances to S422 in which the flag F.VDK bit is reset to 0, and then advances to S424 in which a throttle opening calculation similar to that of S406 is performed. The program then advances to S428 in which the flag F.CCKZ bit is reset to 0 and the program ends.

To describe the running control shown in FIG. 8 with reference to FIG. 10, when the detected vehicle velocity VP exceeds the sum obtained by adding the second vehicle velocity D to the desired vehicle velocity VD, the throttle opening θTH is set to 0, and when the detected vehicle velocity VP is less than the difference obtained by subtracting the first vehicle velocity C from the desired vehicle velocity VD, the acceleration control is conducted on the basis of the calculated desired vehicle acceleration M.

When a switch (transition) is performed from the cut-off cylinder operation to the full-cylinder operation while running control is in progress, the acceleration control (running control) is conducted using a lower value (the second desired vehicle acceleration M×A) than the desired vehicle acceleration M, and thus acceleration is suppressed more directly during running control. This can surely avoid excessive acceleration during a transition from the cut-off cylinder operation to the full-cylinder operation.

It should be noted that also in the third embodiment, the acceleration suppression control is discontinued (S422) when at least one of the following conditions is satisfied or established: the difference between the desired vehicle velocity VD and the detected vehicle velocity VP is less than the vehicle velocity B (S414); a predetermined period of time has passed or elapsed after the flag F.CCKZ bit is set to 1 (in other words, after a change in the desired vehicle acceleration) (S412); and a switch in the running control mode has occurred, i.e., the condition for conducting the running control is changed (S416). As a result, acceleration suppression control is likewise not continued or prolonged excessively.

As explained above, the third embodiment is configured such that during a switch (transition) from the cut-off cylinder operation to the full-cylinder operation while running control is in progress, constant acceleration control (running control) is performed on the basis of a lower value (the second desired vehicle acceleration M×A) than the desired vehicle acceleration M, and thus sharp or drastic increase in velocity with torque fluctuation during a transition from the cut-off cylinder operation to the full-cylinder operation can be effectively avoided.

Figure 11:
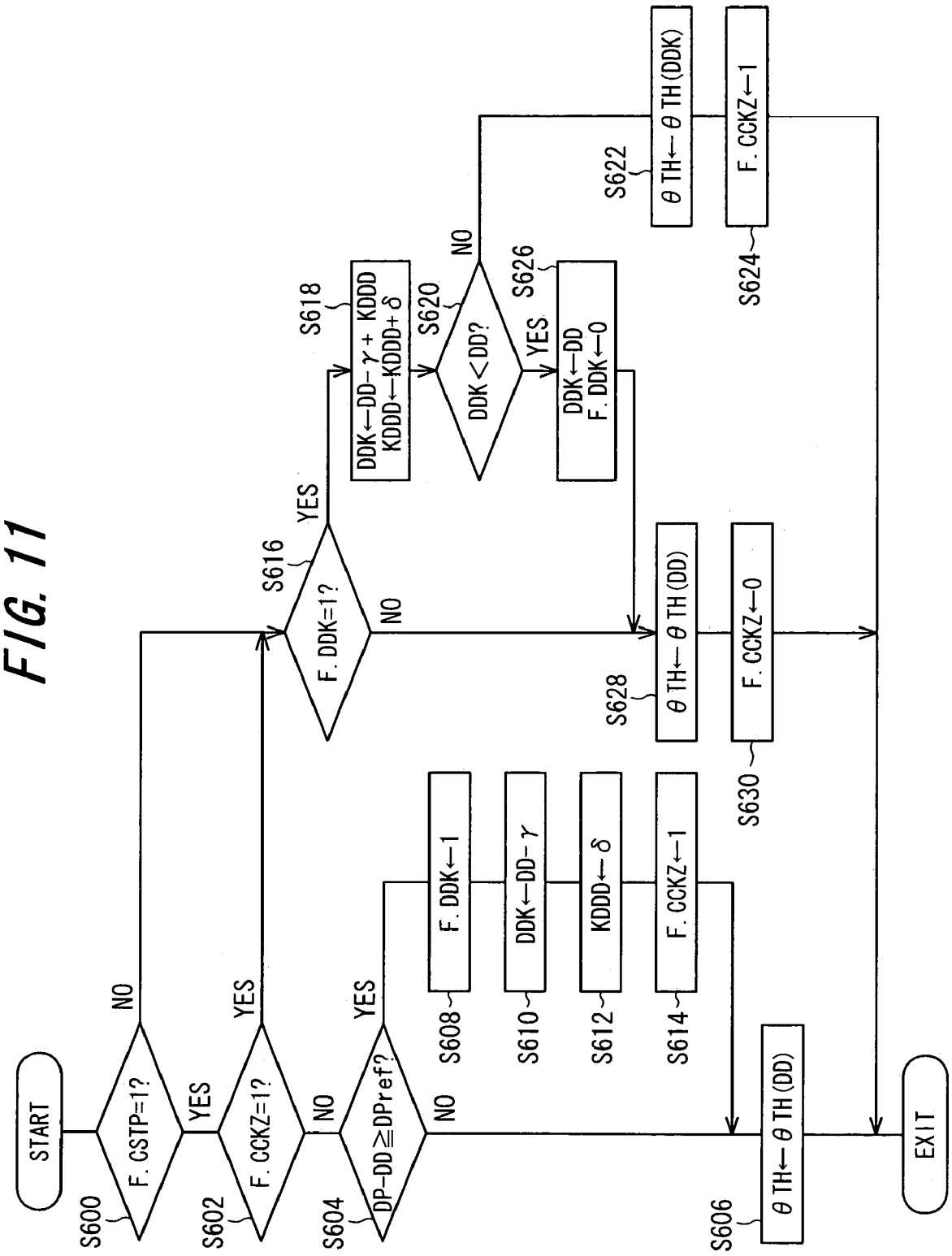
FIG. 11 is a view, similar to FIG. 4, but showing a transition control operation from the cut-off cylinder operation to the full-cylinder operation while running control is in progress from among the operations of a control system for a cylinder cut-off internal combustion engine according to a fourth embodiment of this invention.

FIG. 11 is a view, similar to FIG. 4, but showing a transition control operation from the cut-off cylinder operation to the full-cylinder operation, which is an operation of a control system for a cylinder cut-off internal combustion engine according to a fourth embodiment of this invention.

The fourth embodiment is a modification of the first embodiment in which, instead of the desired vehicle velocity VD, a desired inter-vehicle distance DD is changed. The program illustrated in this diagram is also executed (looped) when the aforementioned flag F.AC bit is set to 1 (when running control is in progress), at TDC or a predetermined crank angle in the vicinity thereof, or at predetermined time intervals.

First, in S600 it is determined whether the bit of a flag F.CSTP is set to 1, and if it does, the program advances to S602 in which it is determined whether the flag F.CCKZ bit is set to 1.

When the determination result in S602 is negative, the program advances to S604 in which a determination is made as to whether or not a difference (deviation) obtained by subtracting the desired inter-vehicle distance DD from a detected inter-vehicle distance DP is equal to or greater than a predetermined value DPref (for example, 10 m), in other words whether the difference between the desired inter-vehicle distance DD and the current inter-vehicle distance DP is equal to or greater than the predetermined value DPref.

When the determination result in S604 is negative, the program advances to S606 in which the throttle opening θTH is calculated on the basis of the desired inter-vehicle distance DD in the engine 10 during the cut-off cylinder operation, more specifically it is calculated in such a way that the difference between the desired inter-vehicle distance DD and detected inter-vehicle distance DP is reduced. The program is then terminated.

When the determination result in S604 is affirmative, the program advances to S608 in which the bit of a flag F.DDK is set to 1. By setting this flag bit to 1, transition control from the cut-off cylinder operation to the full-cylinder operation in order to perform the acceleration control is conducted.

The program then advances to S610 in which a difference obtained by subtracting a value γ from the desired inter-vehicle distance DD is set as a desired inter-vehicle distance during transition control DDK, more specifically as a desired inter-vehicle distance while transition control from the cut-off cylinder operation to the full-cylinder operation is in progress. The program then advances to S612 in which an initial value of a value KDDD is set as δ, and then advances to S614 in which the flag F.CCKZ bit is set to 1.

When the determination result in S600 is negative in a subsequent program loop, the program advances to S616 in which a determination is made as to whether or not the flag F.DDK bit is set to 1. This flag bit was set to 1 previously in S608, and hence the determination result here is usually affirmative. The program then advances to S618. When the determination result in S600 is affirmative, the program advances to S602, and when the determination result there is affirmative, the program advances similarly.

As shown in the drawing, in S618 γ is subtracted from the desired inter-vehicle distance DD, the value KDDD is added thereto, and thus the desired inter-vehicle distance during transition control DDK is calculated. The initial value of the value KDDD is δ, but as shown in the drawing, the value δ is added to KDDD upon each calculation to provide a cumulative value.

Next, the program advances to S620 in which a determination is made as to whether or not the desired inter-vehicle distance during transition control DDK is less than the desired inter-vehicle distance DD, and if not, the program advances to S622 in which the throttle opening θTH is calculated on the basis of the desired inter-vehicle distance during transition control DDK in the engine 10 during the full-cylinder operation, more specifically it is calculated such that the difference between the desired inter-vehicle distance during transition control DDK and the detected inter-vehicle distance DP is reduced. The program then advances to S624 in which the flag F.CCKZ bit is set to 1 and the program ends.

When the determination result in S620 is affirmative, the program advances to S626 in which the desired inter-vehicle distance during transition control DDK is switched with the desired inter-vehicle distance DD and the flag F.DDK is reset to 0. The program then advances to S628 in which the throttle opening θTH is calculated on the basis of the original desired inter-vehicle distance DD in the engine 10 during the full-cylinder operation, more specifically it is calculated such that the difference between the desired inter-vehicle distance DD and the detected inter-vehicle distance DP is reduced. Next, the program advances to S630 in which the flag F.CCKZ bit is reset to 0 and the program is terminated.

Figure 12A:
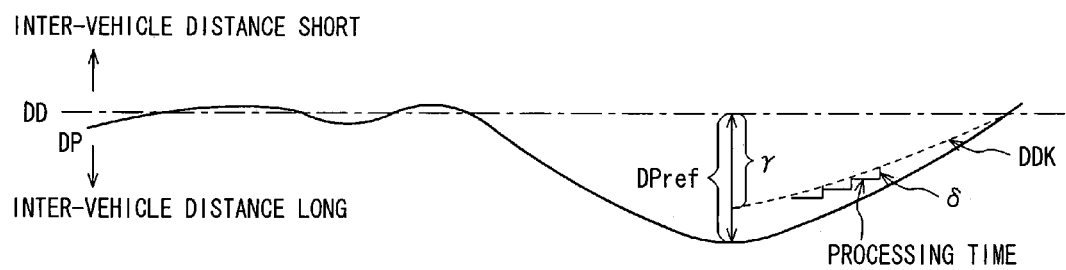
FIG. 12 is a set of time charts each illustrating the processing shown in the flowchart in FIG. 11.

To explain the transition control shown in FIG. 11 with reference to the time charts illustrated in FIG. 12, during the transition control in FIG. 11, as shown in FIG. 12A, when the difference obtained by subtracting the detected inter-vehicle distance DP (shown by the solid line) from the desired inter-vehicle distance DD (shown by the dot/dash line) is equal to or greater than the predetermined value DPref, a value obtained by adding the value KDDD to the difference obtained by subtracting the value γ from the desired inter-vehicle distance DD is set as the second desired inter-vehicle distance DDK, and the throttle opening θTH is calculated based thereon.

In other words, when a switch (transition) is performed from the cut-off cylinder operation to the full-cylinder operation while running control is in progress, the throttle opening θTH is calculated on the basis of the second desired inter-vehicle distance DDK which is obtained by reducing the difference between the actual inter-vehicle distance and the original desired inter-vehicle distance DD in such a manner that, during running control, the desired vehicle velocity is reduced such that acceleration is suppressed. Thus, during a transition from the cut-off cylinder operation to the full-cylinder operation, sharp or drastic increase in velocity with torque fluctuation can be effectively avoided.

Further, since the value KDDD is increased by adding δ whenever the value KDDD is calculated, the second desired inter-vehicle distance DDK is calculated so as to gradually return to or approach the original desired inter-vehicle distance DD upon each calculation.

When it is determined in S620 that the second desired inter-vehicle distance DDK is less than the desired inter-vehicle distance DD, the program advances to S628 (via S626) in which the throttle opening θTH is calculated on the basis of the desired inter-vehicle distance DD, in other words it is calculated in such a way that running control is conducted, thereby preventing the transition control from continuing or prolonging unnecessarily.

Figure 12B:
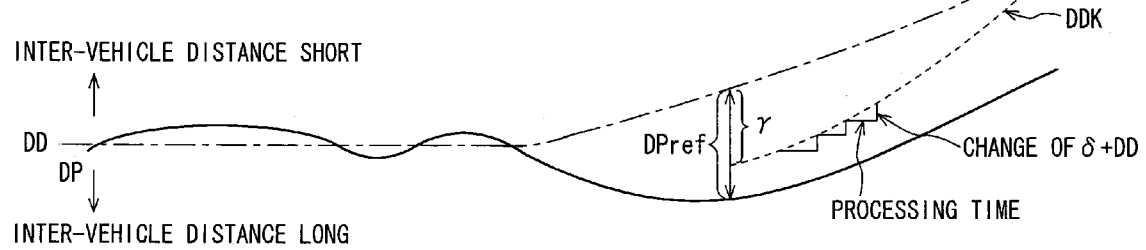

During preceding vehicle follow-up control, in which the vehicle travels while following up the preceding vehicle, the desired inter-vehicle distance DD is calculated on the basis of the running velocity, and hence, as shown in FIG. 12B, the desired inter-vehicle distance DD is changed frequently. Likewise in such a case, since the processing shown in FIG. 11 is executed at predetermined intervals, the second desired inter-vehicle distance DDK is recalculated on the basis of the changed desired inter-vehicle distance DD. As a result, the second desired inter-vehicle distance DDK is set to reliably approach the desired inter-vehicle distance DD even when the desired inter-vehicle distance DD is changed frequently.

As described above, the fourth embodiment is configured such that during running control, acceleration is suppressed by making the desired vehicle velocity fall, and hence during a transition from the cut-off cylinder operation to the full-cylinder operation, sharp or drastic increase in velocity accompanying torque fluctuation can be effectively avoided.

Figure 13:
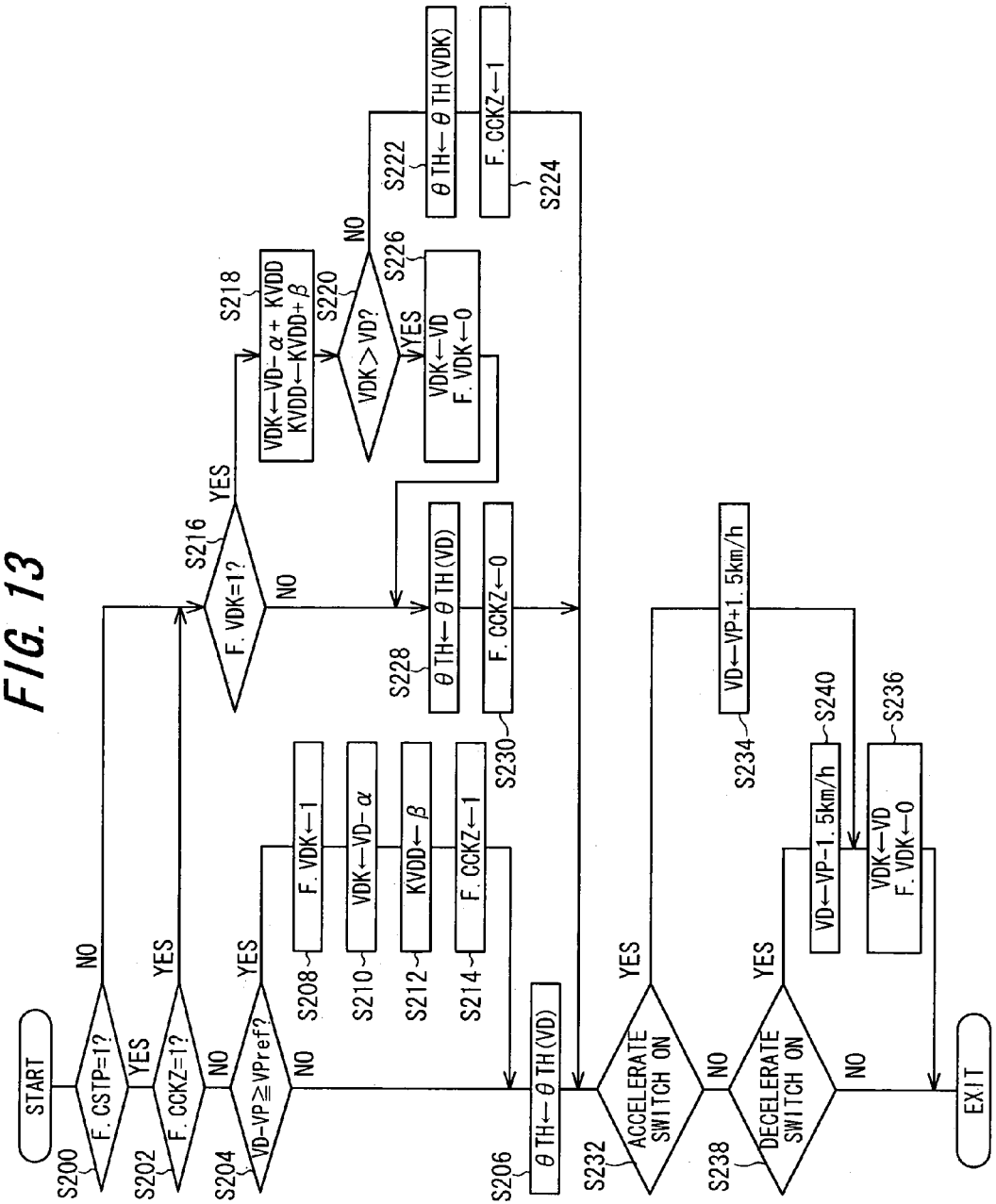
FIG. 13 is a view, similar to FIG. 4, but showing a transition control operation from the cut-off cylinder operation to the full-cylinder operation while running control is in progress from among the operations of a control system for a cylinder cut-off internal combustion engine according to a fifth embodiment of this invention.

FIG. 13 is a view, similar to FIG. 4, but showing a transition control operation from the cut-off cylinder operation to the full-cylinder operation, which is an operation of a control system for a cylinder cut-off internal combustion engine according to a fifth embodiment of this invention.

The fifth embodiment is a modification of the first embodiment, and the program illustrated in the diagram is also executed (looped) when the aforementioned flag F.AC bit is set to 1 (when running control is in progress), at TDC or a predetermined crank angle in the vicinity thereof, or predetermined time intervals.

In the fifth embodiment, when the operator inputs the instruction to accelerate, the acceleration suppression control described above is discontinued. In other words, in the embodiments described above, sharp or drastic increase in velocity with torque fluctuation can be effectively avoided during a transition from the cut-off cylinder operation to the full-cylinder operation by executing the acceleration suppression control, but as a result, when the instruction to increase the desired vehicle velocity is inputted through the accelerate switch 66d, the operator can not experience the feel of acceleration as intended by the switch manipulation and tends to feel discomfort. A similar problem occurs when the instruction to decrease the desired vehicle velocity is inputted via the decelerate switch 66e.

In view of this problem, the fifth embodiment is configured such that when the instruction to increase or decrease the desired vehicle velocity is inputted by the operator through the accelerate switch 66d or decelerate switch 66e, the acceleration suppression control is discontinued, and the operator can feel the acceleration or deceleration as intended by the switch manipulation.

To explain this with reference to FIG. 13, similar processing to that of the first embodiment is performed from S200 through S206, whereupon the program advances to S232 in which it is determined whether the accelerate switch 66d is ON. If the determination result is affirmative, the program advances to S234 in which the desired vehicle velocity VD is updated (changed) to a sum obtained by adding 1.5 km/h to the detected vehicle velocity VP. The program then advances to S236 in which the desired vehicle velocity during transition control VDK is switched with the updated desired vehicle velocity VD and the flag F.VDK bit is reset to 0.

When the determination result in S232 is negative, the program advances to S238 in which a determination is made as to whether or not the decelerate switch 66e is ON, and if it does, the program advances to S240 in which the desired vehicle velocity VD is updated (changed) to a difference obtained by subtracting 1.5 km/h from the detected vehicle velocity VP. The program then advances to S236 in which the desired vehicle velocity during transition control VDK is switched with the updated desired vehicle velocity VD and the flag F.VDK bit is reset to 0.

As a result, when the determination result in S216 of the flowchart in FIG. 13 is negative, the process advances to S228 in which the throttle opening θTH is calculated on the basis of the updated desired vehicle velocity VD in the engine 10 during the full-cylinder operation, more specifically it is calculated such that the difference between the desired vehicle velocity VD and detected vehicle velocity VP is reduced.

Figure 14:
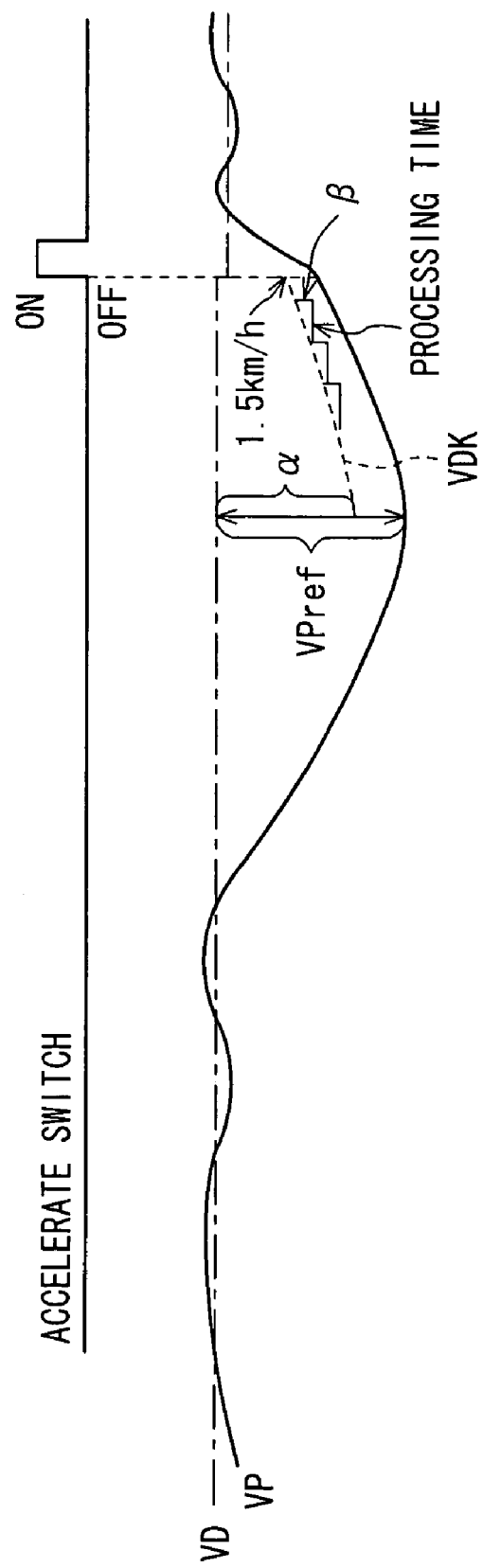
FIG. 14 is a time chart illustrating the processing shown in the flowchart in FIG. 13.
Figure 15:
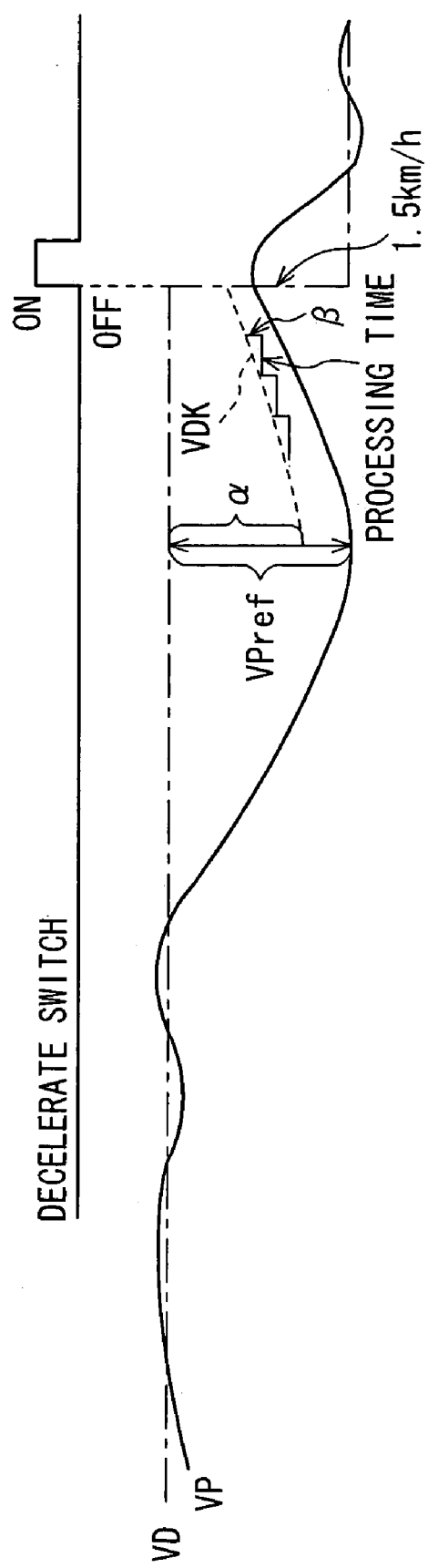
FIG. 15 is a time chart similarly illustrating the processing shown in the flowchart in FIG. 13.

FIG. 14 is a time chart showing transition control performed when the accelerate switch 66d is ON, and FIG. 15 is a time chart showing transition control performed when the decelerate switch 66e is ON. As described above, in the fifth embodiment, when a switch manipulation is made by the operator, the desired vehicle velocity VD is increased or decreased by a predetermined value, in other words the aforementioned acceleration suppression control is discontinued. With this, the operator can have the feel of acceleration or deceleration as intended by the switch manipulation.

Figure 16:
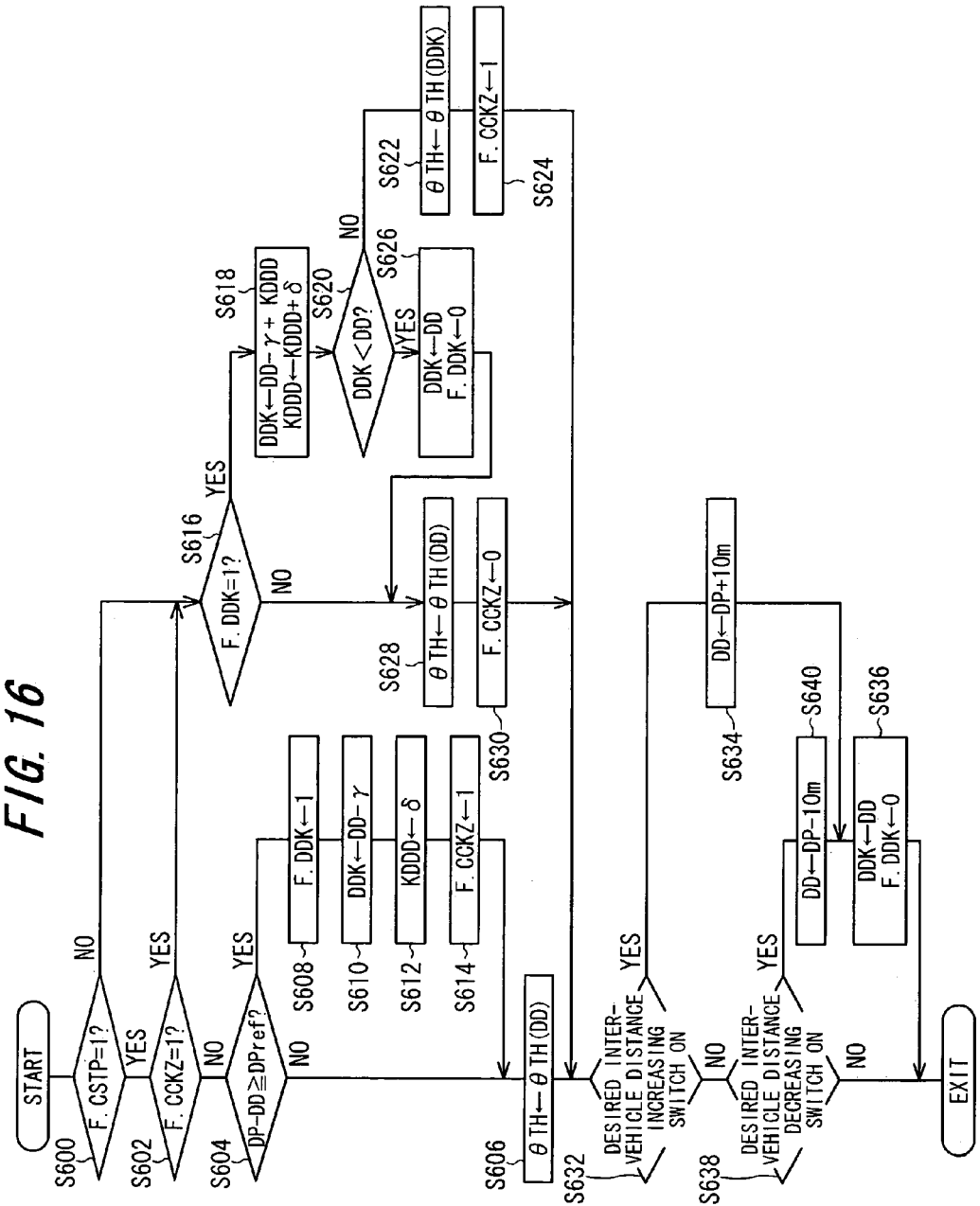
FIG. 16 is a view, similar to FIG. 4, but showing a transition control operation from the cut-off cylinder operation to the full-cylinder operation while running control is in progress from among the operations of a control system for a cylinder cut-off internal combustion engine according to a sixth embodiment of this invention.

FIG. 16 is a view, similar to FIG. 11, but showing a transition control operation from the cut-off cylinder operation to the full-cylinder operation, which is an operation of a control system for a cylinder cut-off internal combustion engine according to a sixth embodiment of this invention.

The sixth embodiment is a modification of the fourth embodiment, and the program illustrated in the diagram is also executed (looped) when the aforementioned flag F.AC bit is set to 1 (when running control is in progress), at TDC or a predetermined crank angle in the vicinity thereof, or at predetermined time intervals.

By manipulating the desired inter-vehicle distance increasing switch 66h or desired inter-vehicle distance decreasing switch 66i, the operator expects to have the feel of acceleration or deceleration, and hence this is substantially equivalent to a case in which the acceleration or deceleration instruction is inputted. In consideration of this point, the sixth embodiment is configured such that when the desired inter-vehicle distance increasing switch 66*h* or desired inter-vehicle distance decreasing switch 66*i* is manipulated by the operator, this is considered to be the same as the situation that the instruction to increase or decrease the desired vehicle velocity is inputted via the accelerate switch 66*d* or decelerate switch 66*e*, and similarly to the fifth embodiment, the acceleration suppression control is discontinued so as to provide the operator with the feel of acceleration or deceleration that is expected by the switch manipulation.

To describe this with reference to FIG. 16, processing similar to that of the fourth embodiment is performed from S600 through S606, whereupon the program advances to S632 in which it is determined whether the desired inter-vehicle distance increasing switch 66*h* is ON. If the determination result is affirmative, the program advances to S634 in which the desired inter-vehicle distance DD is updated (changed) to a sum obtained by adding 10 m to the detected inter-vehicle distance DP. The program then advances to S636 in which the desired inter-vehicle distance during transition control DDK is switched with the updated desired inter-vehicle distance DD and the flag F.DDK bit is reset to 0.

When the determination result in S632 is negative, the program advances to S638 in which it is determined whether the desired inter-vehicle distance decreasing switch 66*i* is ON, and if it does, the program advances to S640 in which the desired inter-vehicle distance DD is updated (modified) to a difference obtained by subtracting 10 m from the detected inter-vehicle distance DP. The program then advances to S636 in which the desired inter-vehicle distance during transition control DDK is switched with the updated desired inter-vehicle distance DD and the flag F.DDK bit is reset to 0.

As a result, when the determination result in S616 of the flowchart in FIG. 16 is negative, the program advances to S628 in which the throttle opening θTH is calculated on the basis of the updated desired inter-vehicle distance DD in the engine 10 during the full-cylinder operation. In other words, the desired inter-vehicle distance increasing control described with relation to the flowchart in FIG. 2 is conducted.

Figure 17:
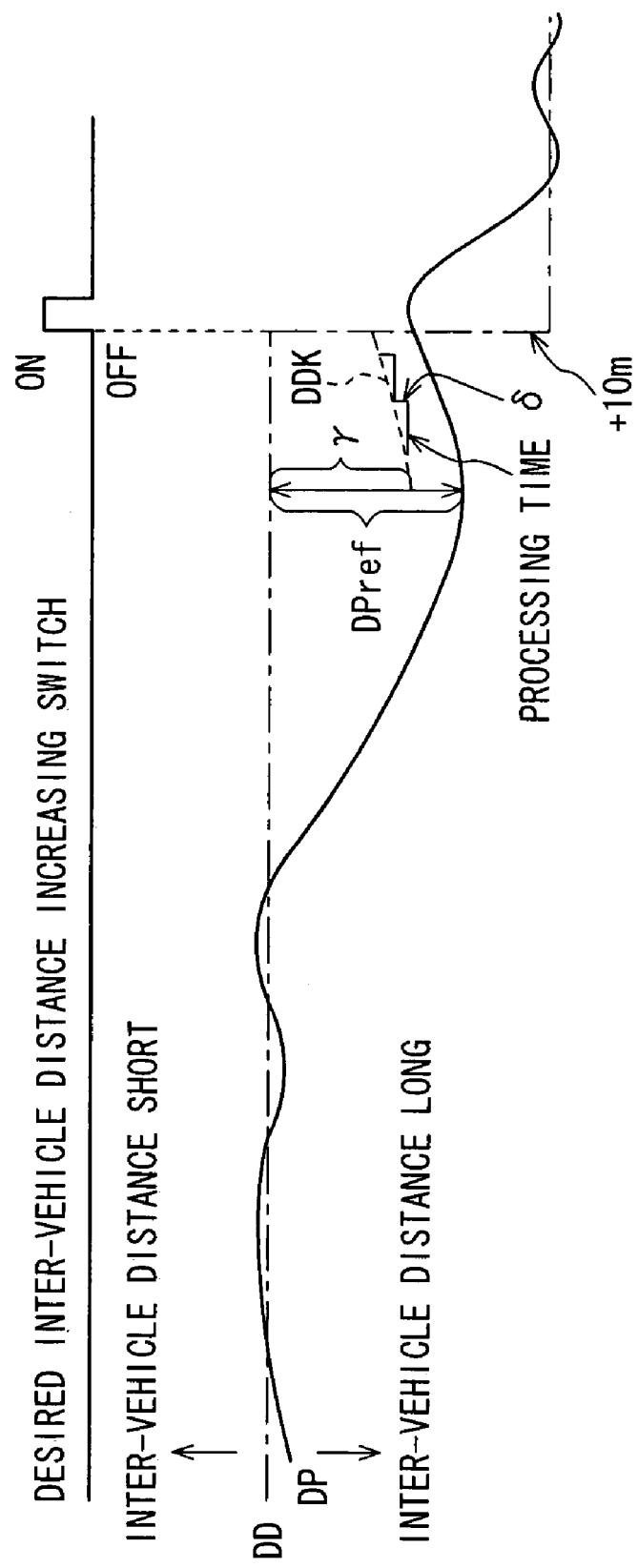
FIG. 17 is a time chart illustrating the processing shown in the flowchart in FIG. 16.

FIG. 17 is a time chart showing transition control performed when the desired inter-vehicle distance increasing switch 66*h* is ON. As shown in the drawing, in the sixth embodiment, when this switch manipulation is done by the operator, the desired inter-vehicle distance DD is increased by a predetermined value, in other words the aforementioned acceleration suppression control is discontinued. With this, the operator can feel deceleration expected by the switch manipulation. Although not shown in the drawing, similar processing is performed when the desired inter-vehicle distance decreasing switch 66*i* is switched ON, excluding reduction of the desired inter-vehicle distance DD, and hence the operator can be provided with the expected acceleration.

The first to sixth embodiments are thus configured to have a system for controlling an internal combustion engine (10) having a plurality of cylinders and mounted on a vehicle, comprising: an engine operation controller (ECU 70, S100 to S110) that conducts a switching control of engine operation based on a load of the engine (throttle opening θTH or a desired torque) between a full-cylinder operation in which all of the cylinders are operative and a cut-off cylinder operation in which some of the cylinders are inoperative; a running controller (ECU 70, S10 to S50) that conducts a running control including at least one of a cruise control in which the vehicle runs at a desired vehicle velocity (VD) and a preceding vehicle follow-up control in which the vehicle runs at a desired vehicle velocity (VD) to maintain a desired inter-vehicle distance (DD) from a preceding vehicle; and an acceleration suppression controller (ECU 70, S200 to S230, S300 to S326, S400 to S428, S600 to S630) that conducts an acceleration suppression control if the engine operation is switched from the cut-off cylinder operation to the full-cylinder operation when the running control is in progress. Hence, sharp or drastic increase in velocity accompanying torque fluctuation when a switch to the full-cylinder operation is performed during running control can be avoided even when control is performed to reduce the vehicle velocity by moving the throttle opening to the closed side in order to maintain the cut-off cylinder operation for as long as possible.

In the system, the acceleration suppression controller conducts the acceleration suppression control (S222) by calculating a second desired vehicle velocity (VDK) that is a value reduced from the desired vehicle velocity (VD)(S208, S210, S218) in such a manner that the running controller conducts the running control such that the vehicle runs at the second desired vehicle velocity (VDK). Accordingly, the difference between the desired vehicle velocity and the actual vehicle velocity can be reduced, and as a result, sharp or drastic increase in velocity accompanying torque fluctuation can reliably be avoided. It should further be noted in the above that, although the acceleration suppression controller conducts the acceleration suppression control by causing the running controller to execute running control on the basis of the second desired velocity, the actual vehicle velocity may be used instead of the second desired velocity.

In the system, the acceleration suppression controller calculates the second desired vehicle velocity (VDK) in such a manner that the second desired vehicle velocity (VDK) is increased gradually to return to the desired vehicle velocity (VD) each time the second desired vehicle velocity (VDK) is calculated (S212, S218). Accordingly, in addition to the aforementioned advantages and effects, acceleration suppression control can be ended smoothly.

In the system, wherein, when the desired vehicle velocity (VD) is changed, the acceleration suppression controller recalculates the second desired vehicle velocity (VDK) based on the changed desired vehicle velocity (VD) (S210). As a result, it becomes possible to determined the second desired vehicle velocity optimally and if the desired velocity must be changed during preceding vehicle follow-up control to maintain the desired inter-vehicle distance in response to the acceleration or deceleration of the preceding vehicle, the desired vehicle velocity can reliably be controlled to the, thus changed, desired value.

In the system, the acceleration suppression controller causes the running controller to conduct the running control such that the vehicle runs at the desired vehicle velocity (VD), when the second desired vehicle velocity (VDK) is equal to or greater than the desired vehicle velocity (VD) (S220). This can prevent unnecessary continuation or prolongation of the acceleration suppression control.

In the system, the acceleration suppression controller conducts the acceleration suppression control by changing a desired load (θTH) that is necessary for maintaining the desired vehicle velocity (VD), more specifically, θTH×A is calculated thereby conducting the acceleration suppression control (S318). With this, sharp or drastic increase in velocity accompanying torque fluctuation can be reliably avoided.

In the system, the acceleration suppression controller discontinues the acceleration suppression control when a predetermined period of time has passed since the change of the desired load (S312, S320), or the acceleration suppression controller discontinues the acceleration suppression control when a difference between the desired vehicle velocity (VD) and a detected vehicle velocity (VP) is less than a predetermined value (B) (S314, S320), or the acceleration suppression controller discontinues the acceleration suppression control when a condition for conducting the running control is changed (S316, S320). With this, unnecessary continuation or prolongation of the acceleration suppression control can be prevented.

The system further includes: a desired vehicle velocity increasing/decreasing switch (accelerate switch 66d, decelerate switch 66e) that is manipulated by an operator to input an instruction to increase or decrease the desired vehicle velocity (VD); and wherein the acceleration suppression controller discontinues the acceleration suppression control when the instruction is inputted (S232 to S240). With this, the operator can be provided with a sense of acceleration or deceleration corresponding to a switch operation.

In the system, the running controller conducts the running control such that the vehicle runs at a desired vehicle acceleration (M) (S406, S502 to S504); and the acceleration suppression controller conducts the acceleration suppression control by calculating a second desired vehicle acceleration (M×A) that is a value reduced from the desired vehicle acceleration (M) in such a manner that the running controller conducts the running control such that the vehicle runs at the second desired vehicle acceleration (M×A) (S418 to S420). As a result, sharp or drastic increase in velocity accompanying torque fluctuation can be reliably avoided.

In the system, the acceleration suppression controller discontinues the acceleration suppression control when a predetermined period of time has passed since the desired vehicle acceleration (M) was changed to the second desired vehicle acceleration (M×A) (S412, S422), or the acceleration suppression controller discontinues the acceleration suppression control when a difference between the desired vehicle velocity (VD) and a detected vehicle velocity (VP) is less than a predetermined value (B) (S414, S422), or the acceleration suppression controller discontinues the acceleration suppression control when a condition for conducting the running control is changed (S416, S422). With this, unnecessary continuation or prolongation of the acceleration suppression control can be prevented.

In the system, the acceleration suppression controller conducts the acceleration suppression control by calculating a second desired inter-vehicle distance (DDK) that is a value obtained by reducing a difference between the desired inter-vehicle distance (DD) and a detected inter-vehicle difference (DP) from the preceding vehicle, in such a manner that the running controller conducts the running control such that the vehicle runs with the second desired inter-vehicle distance (DDK) (S610, S612, S618). As a result, the difference between the desired vehicle velocity and actual velocity can be made small, enabling sharp or drastic increase in velocity accompanying torque fluctuation to be reliably avoided. It should be noted in the above that, although the acceleration suppression controller execute the acceleration suppression control by causing the running controller to execute running control on the basis of the second desired inter-vehicle distance, the actual inter-vehicle distance may be used instead of the second desired inter-vehicle distance.

In the system, the acceleration suppression controller calculates the second desired inter-vehicle distance (DDK) in such a manner that the second desired inter-vehicle distance (DDK) is increased gradually to return to the desired inter-vehicle distance (DD) each time the second desired inter-vehicle distance (DDK) is calculated (S612, S618). With this, in addition to the aforementioned advantages and effects, acceleration suppression control can be ended smoothly.

In the system, when the desired inter-vehicle distance (DD) is changed, the acceleration suppression controller recalculates the second desired inter-vehicle distance (DDK) based on the changed desired inter-vehicle distance (DD) (S610, S612, S618). As a result, it becomes possible to determined the second desired inter-vehicle distance optimally and if the desired inter-vehicle distance must be changed during preceding vehicle follow-up control in response to the acceleration or deceleration of the preceding vehicle, the desired inter-vehicle distance can reliably be controlled to the, thus changed, desired value.

In the system, the acceleration suppression controller causes the running controller to conduct the running control such that the vehicle runs with the desired inter-vehicle distance (DD) (S628), when the second desired inter-vehicle distance (DDK) is less than the desired inter-vehicle distance (DD) (S620), thereby preventing unnecessary continuation or prolongation of the acceleration suppression control.

The system further includes: a desired inter-vehicle distance increasing/decreasing switch (desired inter-vehicle distance increasing switch 66h, desired inter-vehicle distance decreasing switch 66i) that is manipulated by an operator to input an instruction to increase or decrease the desired inter-vehicle distance (DD); and wherein the acceleration suppression controller discontinues the acceleration suppression control when the instruction is inputted (S632 to S640). As a result, the operator can be provided with the feel of acceleration or deceleration corresponding to the switch operation.

It should be noted in the above that, although the throttle opening θTH is used as a parameter indicative of the load of the engine 10, a desired torque may instead be used. In an engine in which fuel is directly injected into a cylinder, for example, in other words a spark ignition engine in which gasoline fuel is injected directly into a combustion chamber or a compression ignition engine, the desired torque is usually determined from the engine speed, accelerator position, and so on. In such a type of engine, the desired torque may be used in lieu of the throttle opening. The same also applies to electric vehicles and the like.

It should further be noted in the above that, although a gasoline fuel engine is described as an example of the internal combustion engine, other types of engines which use diesel fuel may instead be employed.

It should further be noted in the above that, although cruise control and preceding vehicle follow-up control (inter-vehicle distance control) are described as examples of the running control, this invention may be applied to a case in which the cruise control alone is conducted.

The entire disclosure of Japanese Patent Application Nos. 2003-30812 filed on Feb. 7, 2003, and 2003-136954 filed on May 15, 2003, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling an internal combustion engine having a plurality of cylinders and mounted on a vehicle, comprising:
   an engine operation controller that conducts a switching control of engine operation based on a load of the engine between a full-cylinder operation in which all of the cylinders are operative and a cut-off cylinder operation in which some of the cylinders are inoperative, wherein the engine operative controller outputs a first signal indicating a state of the switching control;

a running controller that conducts a running control including at least one of a cruise control in which the vehicle runs at a desired vehicle velocity and a preceding vehicle follow-up control in which the vehicle runs at a desired vehicle velocity to maintain a desired inter-vehicle distance from a preceding vehicle, wherein the running controller outputs a second signal indicating the state of a running control; and an acceleration suppression controller that receives the first and second signals, and conducts an acceleration suppression control if the first signal indicates that the engine operation is switched from the cut-off cylinder operation to the full-cylinder operation and the second signal indicates that the running control is in progress.

2. A system according to claim 1, wherein the acceleration suppression controller conducts the acceleration suppression control by calculating a second desired vehicle velocity that is a value reduced from the desired vehicle velocity in such a manner that the running controller conducts the running control such that the vehicle runs at the second desired vehicle velocity.

3. A system according to claim 2, wherein the acceleration suppression controller calculates the second desired vehicle velocity in such a manner that the second desired vehicle velocity is increased gradually to return to the desired vehicle velocity each time the second desired vehicle velocity is calculated.

4. A system according to claim 2, wherein, when the desired vehicle velocity is changed, the acceleration suppression controller recalculates the second desired vehicle velocity based on the changed desired vehicle velocity.

5. A system according to claim 2, wherein the acceleration suppression controller causes the running controller to conduct the running control such that the vehicle runs at the desired vehicle velocity, when the second desired vehicle velocity is equal to or greater than the desired vehicle velocity.

6. A system according to claim 1, wherein the acceleration suppression controller conducts the acceleration suppression control by changing a desired load that is necessary for maintaining the desired vehicle velocity.

7. A system according to claim 6, wherein the acceleration suppression controller discontinues the acceleration suppression control when a predetermined period of time has passed since the change of the desired load.

8. A system according to claim 6, wherein the acceleration suppression controller discontinues the acceleration suppression control when a difference between the desired vehicle velocity and a detected vehicle velocity is less than a predetermined value.

9. A system according to claim 6, wherein the acceleration suppression controller discontinues the acceleration suppression control when a condition for conducting the running control is changed.

10. A system according to claim 1, further including: a desired vehicle velocity increasing/decreasing switch that is manipulated by an operator to input an instruction to increase or decrease the desired vehicle velocity; and wherein the acceleration suppression controller discontinues the acceleration suppression control when the instruction is inputted.

11. A system according to claim 1, wherein the running controller conducts the running control such that the vehicle runs at a desired vehicle acceleration; and the acceleration suppression controller conducts the acceleration suppression control by calculating a second desired vehicle acceleration that is a value reduced from the desired vehicle acceleration in such a manner that the running controller conducts the running control such that the vehicle runs at the second desired vehicle acceleration.

12. A system according to claim 11, wherein the acceleration suppression controller discontinues the acceleration suppression control when a predetermined period of time has passed since the desired vehicle acceleration was changed to the second desired vehicle acceleration.

13. A system according to claim 11, wherein the acceleration suppression controller discontinues the acceleration suppression control when a difference between the desired vehicle velocity and a detected vehicle velocity is less than a predetermined value.

14. A system according to claim 11, wherein the acceleration suppression controller discontinues the acceleration suppression control when a condition for conducting the running control is changed.

15. A system according to claim 1, wherein the acceleration suppression controller conducts the acceleration suppression control by calculating a second desired inter-vehicle distance that is a value obtained by reducing a difference between the desired inter-vehicle distance and a detected inter-vehicle difference from the preceding vehicle, in such a manner that the running controller conducts the running control such that the vehicle runs with the second desired inter-vehicle distance.

16. A system according to claim 15, wherein the acceleration suppression controller calculates the second desired inter-vehicle distance in such a manner that the second desired inter-vehicle distance is increased gradually to return to the desired inter-vehicle distance each time the second desired inter-vehicle distance is calculated.

17. A system according to claim 15, wherein, when the desired inter-vehicle distance is changed, the acceleration suppression controller recalculates the second desired inter-vehicle distance based on the changed desired inter-vehicle distance.

18. A system according to claim 15, wherein the acceleration suppression controller causes the running controller to conduct the running control such that the vehicle runs with the desired inter-vehicle distance, when the second desired inter-vehicle distance is less than the desired inter-vehicle distance.

19. A system according to claim 1, further including: a desired inter-vehicle distance increasing/decreasing switch that is manipulated by an operator to input an instruction to increase or decrease the desired inter-vehicle distance; and wherein the acceleration suppression controller discontinues the acceleration suppression control when the instruction is inputted.

* * * * *

UNITED STATES PATENT AND TRADEMARK OFFICE
CERTIFICATE OF CORRECTION

PATENT NO. : 7,433,774 B2
APPLICATION NO. : 10/772370
DATED : October 7, 2008
INVENTOR(S) : Sen et al.

Page 1 of 1

It is certified that error appears in the above-identified patent and that said Letters Patent is hereby corrected as shown below:

In Claim 1, Column 23, line 9, please delete the word "the" and insert therefore the word --a--.

In Claim 1, Column 23, line 10, please delete the word "a" and insert therefore the word --the--.

Signed and Sealed this

Thirtieth Day of December, 2008

JON W. DUDAS
*Director of the United States Patent and Trademark Office*